(12) United States Patent
Cave et al.

(10) Patent No.: US 9,924,350 B2
(45) Date of Patent: Mar. 20, 2018

(54) UTILIZING A PLURALITY OF UPLINK CARRIERS AND A PLURALITY OF DOWNLINK CARRIERS FOR MULTI-CELL COMMUNICATIONS

(71) Applicant: InterDigital Patent Holdings, Inc., Wilmington, DE (US)

(72) Inventors: Christopher R. Cave, Dollard-des-Ormeaux (CA); Diana Pani, Montreal (CA); Benoit Pelletier, Roxboro (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 141 days.

(21) Appl. No.: 14/930,241

(22) Filed: Nov. 2, 2015

(65) Prior Publication Data
US 2016/0056944 A1 Feb. 25, 2016

Related U.S. Application Data

(63) Continuation of application No. 12/625,845, filed on Nov. 25, 2009, now abandoned.
(Continued)

(51) Int. Cl.
*H04W 8/26* (2009.01)
*H04W 28/02* (2009.01)
(Continued)

(52) U.S. Cl.
CPC ............. *H04W 8/26* (2013.01); *H04L 5/0098* (2013.01); *H04W 28/021* (2013.01);
(Continued)

(58) Field of Classification Search
CPC ..... H04W 28/12; H04W 36/00; H04W 74/04; H04W 8/26; H04W 28/021; H04W 28/0284

See application file for complete search history.

(56) References Cited

U.S. PATENT DOCUMENTS 7,953,048 B2 5/2011 Yoon et al.
8,107,885 B2 1/2012 Love et al.
(Continued)

FOREIGN PATENT DOCUMENTS

CN 1867177 A 11/2006
CN 1893344 A 1/2007
(Continued)

OTHER PUBLICATIONS

Ericsson et al., "Introduction of Dual-Cell HSDPA Operation on Adjacent Carriers," 3GPP TSG-RAN WG1 Meeting #54bis, R1-084031, Prague, Czech Republic (Sep. 29-Oct. 3, 2008).
(Continued)

*Primary Examiner* — Raj Jain
(74) *Attorney, Agent, or Firm* — Volpe and Koenig, P.C.

(57) ABSTRACT

A wireless transmit/receive unit (WTRU) may communicate on a primary cell and a secondary cell. A transceiver of the WTRU may receive a medium access control (MAC) message indicating activation or deactivation of the secondary cell. A processor of the WTRU may start a timer in response to the activation of the secondary cell. The WTRU may deactivate the secondary cell on a condition that the timer expires.

12 Claims, 10 Drawing Sheets

Related U.S. Application Data

(60) Provisional application No. 61/168,750, filed on Apr. 13, 2009, provisional application No. 61/141,926, filed on Dec. 31, 2008, provisional application No. 61/117,854, filed on Nov. 25, 2008.

(51) Int. Cl.
*H04W 72/02* (2009.01)
*H04L 5/00* (2006.01)
*H04W 72/04* (2009.01)
*H04W 76/04* (2009.01)

(52) U.S. Cl.
CPC ....... *H04W 28/0284* (2013.01); *H04W 72/02* (2013.01); *H04W 72/0406* (2013.01); *H04W 72/0446* (2013.01); *H04W 72/0453* (2013.01); *H04W 76/048* (2013.01); *H04W 72/042* (2013.01)

(56) References Cited

U.S. PATENT DOCUMENTS

| | | | |
|---|---|---|---|
| 8,169,953 | B2 | 5/2012 | Damnjanovic et al. |
| 2003/0210674 | A1* | 11/2003 | Honkasalo .............. H04W 8/26 370/338 |
| 2006/0274712 | A1 | 12/2006 | Malladi et al. |
| 2007/0070908 | A1 | 3/2007 | Ghosh et al. |
| 2007/0097937 | A1 | 3/2007 | Kubota et al. |
| 2007/0091817 | A1 | 4/2007 | Yoon et al. |
| 2008/0013492 | A1* | 1/2008 | Lee ....................... H04W 36/10 370/331 |
| 2008/0186892 | A1 | 8/2008 | Damnjanovic |
| 2009/0196230 | A1 | 8/2009 | Kim et al. |
| 2009/0316575 | A1* | 12/2009 | Gholmieh ........... H04W 76/048 370/225 |
| 2010/0128565 | A1* | 5/2010 | Golparian .............. G01V 1/223 367/79 |
| 2016/0056944 | A1* | 2/2016 | Cave ..................... H04W 72/02 370/336 |

FOREIGN PATENT DOCUMENTS

| | | |
|---|---|---|
| CN | 101098294 A | 1/2008 |
| CN | 101600245 A | 12/2009 |
| WO | 06/125149 | 11/2006 |
| WO | 07/035045 | 3/2007 |
| WO | 08/069950 | 6/2008 |

OTHER PUBLICATIONS

ITRI, "Discussion of DRX in Carrier Aggregation," 3GPP TSG-RAN WG2 #67bis, R2-096042, Miyazaki, Japan (Oct. 12-16, 2009).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.19.0 (May 2008).
Third Generation Partnership Project, "Technical Specification Group Radio Access Network; Radio Resource Control (RRC); Protocol Specification (Release 4)," 3GPP TS 25.331 V4.20.0 (Dec. 2008).
Third Generation Partnership Project, "Technical Specification Group Radio Access Network; Radio Resource Control (RRC); Protocol Specification (Release 5)," 3GPP TS 25.331 V5.22.1 (Aug. 2008).
Third Generation Partnership Project, "Technical Specification Group Radio Access Network; Radio Resource Control (RRC); Protocol Specification (Release 5)," 3GPP TS 25.331 V5.24.0 (Jun. 2009).
Third Generation Partnership Project, "Technical Specification Group Radio Access Network; Radio Resource Control (RRC); Protocol Specification (Release 6)," 3GPP TS 25.331 V6.19.0 (Sep. 2008).
Third Generation Partnership Project, "Technical Specification Group Radio Access Network; Radio Resource Control (RRC); Protocol Specification (Release 6)," 3GPP TS 25.331 V6.23.0 (Sep. 2009).
Third Generation Partnership Project, "Technical Specification Group Radio Access Network; Radio Resource Control (RRC); Protocol Specification (Release 7)," 3GPP TS 25.331 V7.10.0 (Sep. 2008).
Third Generation Partnership Project, "Technical Specification Group Radio Access Network; Radio Resource Control (RRC); Protocol Specification (Release 7)," 3GPP TS 25.331 V7.14.0 (Sep. 2009).
Third Generation Partnership Project, "Technical Specification Group Radio Access Network; Radio Resource Control (RRC); Protocol Specification (Release 8)," 3GPP TS 25.331 V8.4.0 (Sep. 2008).
Third Generation Partnership Project, "Technical Specification Group Radio Access Network; Radio Resource Control (RRC); Protocol Specification (Release 8)," 3GPP TS 25.331 V8.8.0 (Sep. 2009).
Third Generation Partnership Project, "Technical Specification Group Radio Access Network; Radio Resource Control (RRC); Protocol Specification (Release 9)," 3GPP TS 25.331 V9.0.0 (Sep. 2009).
Ericsson et al., "Corrections to DC-HSUPA operation," 3GPP TSG-RAN WG2 Meeting #68, R2-097548 (Nov. 9-13, 2009).
Ericsson et al., "Introduction of Dual-Cell HSDPA Operation on Adjacent Carriers," 3GPP TSG-RAN WG1 Meeting #54, R1-083396, Jeju, Korea (Aug. 18-22, 2008).
Ericsson, "Impact of Dual Carrier," 3GPP TSG-RAN WG3 Meeting #61bis, R3-082727, Prague, Czechia (Sep. 30-Oct. 3, 2008).
Ericsson, et al. "Introduction of DC-HSUPA", 3GPP TSG-RAN WG1, Meeting #57, 25.212 CR Draft V8.5.0, Tdoc R1-092919, (Los Angeles, CA, Jun. 29-Jul. 3, 2009).
Ericsson, et al. "Introduction of DC-HSUPA", 3GPP TSG-RAN WG1, Meeting #58bis, 25.212 CR V9.0.0, Tdoc R1-094359, (Miyazaki, Japan, Oct. 12-16, 2009).
Ericsson, et al. "Introduction of DC-HSUPA", 3GPP TSG-RAN WG1, Meeting #57bis, 25.214 CR Draft V8.6.0, Tdoc R1-092970, (Los Angeles, CA, Jun. 29-Jul. 3, 2009).
Ericsson, et al. "Introduction of DC-HSUPA", 3GPP TSG-RAN WG1, Meeting #58bis, 25.214 CR V9.0.0, Tdoc R1-094361, (Miyazaki, Japan, Oct. 12-16, 2009).
Huawei, "Discussion on supplementary carrier control," 3GPP TSG-RAN WG1 #54, R1-083076, Jeju, Korea (Aug. 18-22, 2008).
InterDigital, "DTX and carrier activation/deactivation for DC-HSUPA," 3GPP TSG-RAN WG2 Meeting #66, R2-093201 (May 4-8, 2009).
InterDigital, "Handling of secondary serving HS-DSCH cell re-activation," 3GPP TSG-WG2 Meeting #65, R2-091412, Athens, Greece (Feb. 9-13, 2009).
NTT DoCoMo, "Initial Access Procedure for Asymmetric Wider Bandwidth in LTE-Advanced," 3GPP TSG RAN WG1 Meeting #55, R1-084249 (Nov. 10-14, 2008).
Panasonic, "Consideration on Multicarrier Transmission scheme for LTE-Adv uplink," 3GPP TSG RAN WG1 Meeting #53bis, R1-082398 (Jun. 30-Jul. 4, 2008).
Qualcomm Europe, "DC-HSDPA and CPC," 3GPP TSG-RAN WG1 #53bis, R1-082294 (Jun. 30-Jul. 4, 2008).
Qualcomm Europe, "RAN3 Impact of Dual Carrier HSDPA," 3GPP TSG-RAN WG3 Meeting #61 bis, R3-082614, Prague, Czech Republic (Sep. 30-Oct. 3, 2008).
Samsung, "Discussion on activation/deactivation of dual-cell HSDPA," 3GPP TSG RAN WG1 Meeting #54, R1-082882, Jeju, Korea (Aug. 18-22, 2008).

(56) References Cited

OTHER PUBLICATIONS

Samsung, "Uplink control channel for dual-cell HSDPA," 3GPP TSG RAN WG1 Meeting #53bis, R1-082324, Warsaw, Poland (Jun. 30-Jul. 4, 2008).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.3.0 (Sep. 2008).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.7.0 (Sep. 2009).

Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.0.0 (Sep. 2009).

Third Generation Partnership Project, "Technical Specification Group Radio Access Network; High Speed Downlink Packet Access (HSDPA); Overall Description; Stage 2 (Release 7)," 3GPP TS 25.308 V7.8.0 (Sep. 2008).

Third Generation Partnership Project, "Technical Specification Group Radio Access Network; High Speed Downlink Packet Access (HSDPA); Overall Description; Stage 2 (Release 7)," 3GPP TS 25.308 V7.10.0 (Jun. 2009).

Third Generation Partnership Project, "Technical Specification Group Radio Access Network; High Speed Downlink Packet Access (HSDPA); Overall Description; Stage 2 (Release 8)," 3GPP TS 25.308 V8.3.0 (Sep. 2008).

Third Generation Partnership Project, "Technical Specification Group Radio Access Network; High Speed Downlink Packet Access (HSDPA); Overall Description; Stage 2 (Release 8)," 3GPP TS 25.308 V8.7.0 (Sep. 2009).

Third Generation Partnership Project, "Technical Specification Group Radio Access Network; Enhanced uplink; Overall description; Stage 2 (Release 8)," 3GPP TS 25.319 V8.3.0 (Sep. 2008).

Third Generation Partnership Project, "Technical Specification Group Radio Access Network; Enhanced uplink; Overall description; Stage 2 (Release 8)," 3GPP TS 25.319 V8.7.0 (Sep. 2009).

Third Generation Partnership Project, "Technical Specification Group Radio Access Network; Enhanced uplink; Overall description; Stage 2 (Release 7)," 3GPP TS 25.319 V7.6.0 (May 2008).

Third Generation Partnership Project, "Technical Specification Group Radio Access Network; Enhanced uplink; Overall description; Stage 2 (Release 7)," 3GPP TS 25.319 V7.7.0 (Jun. 2009).

Third Generation Partnership Project, "Technical Specification Group Radio Access Network; UTRAN lub interface Node B Application Part (NBAP) signalling (Release 7)," 3GPP TS 25.433 V7.10.0 (Sep. 2008).

Third Generation Partnership Project, "Technical Specification Group Radio Access Network; Multiplexing and channel coding (FDD) (Release 9)," 3GPP TS 25.212 V9.0.0 (Sep. 2009).

Third Generation Partnership Project, "Technical Specification Group Radio Access Network; Multiplexing and channel coding (FDD) (Release 6)," 3GPP TS 25.212 V6.10.0 (Dec. 2006).

Third Generation Partnership Project, "Technical Specification Group Radio Access Network; Physical layer procedures (FDD) (Release 9)," 3GPP TS 25.214 V9.0.0 (Sep. 2009).

Third Generation Partnership Project, "Technical Specification Group Radio Access Network; Medium Access Control (MAC) protocol specification (Release 7)," 3GPP TS 25.321 V7.10.0 (Sep. 2008).

Third Generation Partnership Project, "Technical Specification Group Radio Access Network; Physical layer procedures (FDD) (Release 8)," 3GPP TS 25.214 V8.3.0 (Sep. 2008).

Third Generation Partnership Project, "Technical Specification Group Radio Access Network; Multiplexing and channel coding (FDD) (Release 7)," 3GPP TS 25.212 V7.11.0 (Sep. 2009).

Third Generation Partnership Project, "Technical Specification Group Radio Access Network; Physical layer procedures (FDD) (Release 8)," 3GPP TS 25.214 V8.7.0 (Sep. 2009).

Third Generation Partnership Project, "Technical Specification Group Radio Access Network; Multiplexing and channel coding (FDD) (Release 8)," 3GPP TS 25.212 V8.3.0 (Sep. 2008).

Third Generation Partnership Project, "Technical Specification Group Radio Access Network; Medium Access Control (MAC) protocol specification (Release 9)," 3GPP TS 25.321 V9.0.0 (Sep. 2009).

Third Generation Partnership Project, "Technical Specification Group Radio Access Network; Medium Access Control (MAC) protocol specification (Release 8)," 3GPP TS 25.321 V8.7.0 (Sep. 2009).

Third Generation Partnership Project, "Technical Specification Group Radio Access Network; Multiplexing and channel coding (FDD) (Release 7)," 3GPP TS 25.212 V7.9.0 (Sep. 2008).

Third Generation Partnership Project, "Technical Specification Group Radio Access Network; Multiplexing and channel coding (FDD) (Release 8)," 3GPP TS 25.212 V8.6.0 (Sep. 2009).

Third Generation Partnership Project, "Technical Specification Group Radio Access Network; Medium Access Control (MAC) protocol specification (Release 8)," 3GPP TS 25.321 V8.3.0 (Sep. 2008).

Third Generation Partnership Project, "Technical Specification Group Radio Access Network; Medium Access Control (MAC) protocol specification (Release 5)," 3GPP TS 25.321 V5.14.0 (Sep. 2008).

Third Generation Partnership Project, "Technical Specification Group Radio Access Network; Medium Access Control (MAC) protocol specification (Release 6)," 3GPP TS 25.321 V6.16.0 (Sep. 2008).

Third Generation Partnership Project, "Technical Specification Group Radio Access Network; Medium Access Control (MAC) protocol specification (Release 7)," 3GPP TS 25.321 V7.14.0 (Sep. 2009).

Third Generation Partnership Project, "Technical Specification Group Radio Access Network; UTRAN lub interface Node B Application Part (NBAP) signalling (Release 9)," 3GPP TS 25.433 V9.0.0 (Sep. 2009).

Third Generation Partnership Project, "Technical Specification Group Radio Access Network; Physical layer procedures (FDD) (Release 7)," 3GPP TS 25.214 V7.9.0 (May 2008).

Third Generation Partnership Project, "Technical Specification Group Radio Access Network; Physical layer procedures (FDD) (Release 6)," 3GPP TS 25.214 V6.11.0 (Dec. 2006).

Third Generation Partnership Project, "Technical Specification Group Radio Access Network; UTRAN lub interface Node B Application Part (NBAP) signalling (Release 8)," 3GPP TS 25.433 V8.6.0 (Sep. 2009).

Third Generation Partnership Project, "Technical Specification Group Radio Access Network; Physical layer procedures (FDD) (Release 7)," 3GPP TS 25.214 V7.13.0 (Sep. 2009).

Third Generation Partnership Project, "Technical Specification Group Radio Access Network; UTRAN lub interface Node B Application Part (NBAP) signalling (Release 8)," 3GPP TS 25.433 V8.2.0 (Sep. 2008).

Third Generation Partnership Project, "Technical Specification Group Radio Access Network; UTRAN lub interface Node B Application Part (NBAP) signalling (Release 6)," 3GPP TS 25.433 V6.17.0 (Jun. 2008).

Third Generation Partnership Project, "Technical Specification Group Radio Access Network; UTRAN lub interface Node B Application Part (NBAP) signalling (Release 7)," 3GPP TS 25.433 V7.14.0 (Sep. 2009).

Third Generation Partnership Project, "Technical Specification Group Radio Access Network; Spreading and modulation (FDD) (Release 1999)," 3GPP TS 25.213 V3.9.0 (Dec. 2003).

Third Generation Partnership Project, "Technical Specification Group Radio Access Network; Spreading and modulation (FDD) (Release 4)," 3G TS 25.213 V4.4.0 (Dec. 2003).

Third Generation Partnership Project, "Technical Specification Group Radio Access Network; Spreading and modulation (FDD) (Release 5)," 3GPP TS 25.213 V5.6.0 (Jun. 2005).

(56) References Cited

OTHER PUBLICATIONS

Third Generation Partnership Project, "Technical Specification Group Radio Access Network; Spreading and modulation (FDD) (Release 6)," 3GPP TS 25.213 V6.5.0 (Mar. 2006).

Third Generation Partnership Project, "Technical Specification Group Radio Access Network; Spreading and modulation (FDD) (Release 7)," 3GPP TS 25.213 V7.6.0 (Sep. 2008).

Third Generation Partnership Project, "Technical Specification Group Radio Access Network; Spreading and modulation (FDD) (Release 8)," 3GPP TS 25.213 V8.2.0 (Sep. 2008).

Third Generation Partnership Project, "Technical Specification Group Radio Access Network; Spreading and modulation (FDD) (Release 8)," 3GPP TS 25.213 V8.4.0 (Mar. 2009).

Third Generation Partnership Project, "Technical Specification Group Radio Access Network; Spreading and modulation (FDD) (Release 9)," 3GPP TS 25.213 V9.0.0 (Sep. 2009).

Third Generation Partnership Project, "Technical Specification Group Radio Access Network; Spreading and modulation (FDD) (Release 9)," 3GPP TS 25.213 V9.2.0 (Sep. 2010).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.3.0 (Sep. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.7.0 (Sep. 2009).

Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.0.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.10.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.1.0 (Sep. 2009).

* cited by examiner

UTILIZING A PLURALITY OF UPLINK CARRIERS AND A PLURALITY OF DOWNLINK CARRIERS FOR MULTI-CELL COMMUNICATIONS

CROSS REFERENCE TO RELATED APPLICATIONS

This application is a continuation of U.S. patent application Ser. No. 12/625,845, filed Nov. 25, 2009, which claims the benefit of U.S. provisional application Nos. 61/117,854 filed Nov. 25, 2008, 61/141,926 filed Dec. 31, 2008, and 61/168,750 filed Apr. 13, 2009, which are incorporated by reference as if fully set forth herein.

FIELD OF INVENTION

This application is related to wireless communications.

BACKGROUND

Wireless communication systems keep evolving to meet the needs for providing continuous and faster access to a data network. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems.

A multi-carrier system may increase the bandwidth available in a wireless communication system. For instance, a dual carrier system may double the bandwidth when compared to a single carrier system and a tri-carrier system may triple the bandwidth when compared to a single carrier system, etc. In addition to this throughput gain, diversity and joint scheduling gains may also be achieved. This may result in improving the quality of service (QoS) for end users. Further, the use of multiple carriers may be used in combination with multiple-input multiple-output (MIMO).

By way of example, in the context of Third Generation Partnership Project (3GPP) system, dual cell high speed downlink packet access (DC-HSDPA) is included in Release 8 of the 3GPP specifications. With DC-HSDPA, a base station (also referred to as a Node-B) communicates with a wireless transmit/receive unit (WTRU) over two downlink carriers simultaneously. This may double the bandwidth and the peak data rate available to WTRUs and also has a potential to increase the network efficiency by means of fast scheduling and fast channel feedback over two carriers.

For DC-HSDPA operation, each WTRU may be assigned two downlink carriers: an anchor carrier (primary carrier) and a supplementary carrier (secondary carrier). The anchor carrier may carry dedicated and shared control channels used for high speed downlink shared channel (HS-DSCH), enhanced dedicated channel (E-DCH), and dedicated channel (DCH) operations (e.g., fractional dedicated physical channel (F-DPCH), E-DCH HARQ indicator channel (E-HICH), E-DCH relative grant channel (E-RGCH), E-DCH absolute grant channel (E-AGCH), common pilot channel (CPICH), high speed shared control channel (HS-SCCH), and high speed physical downlink shared channel (HS-PDSCH), and the like). The supplementary carrier may carry the CPICH, HS-SCCH and HS-PDSCH for the WTRU. The uplink transmission remains on a single carrier as in the current systems. The high speed dedicated physical control channel (HS-DPCCH) feedback information may be provided on the uplink carrier to the Node-B and contains information for each downlink carrier.

FIG. 1 shows a medium access control (MAC) layer structure for DC-HSDPA operation. The MAC-ehs entity includes one hybrid automatic repeat request (HARQ) entity per HS-DSCH transport channel. HARQ retransmissions may occur over the same transport channel and thus may reduce the benefit of frequency diversity potentially brought by the use of more than one carrier if each HS-DSCH transport channel has a fixed mapping to physical channel resources. However, it has been suggested that the mapping between an HS-DSCH and physical resources (e.g., codes and carrier frequencies) may be dynamically modified in order to provide a diversity benefit.

Multi-carrier or multi-cell uplink transmissions may be implemented in order to increase data rates and capacity in the uplink. For example, the use of multi-cell uplink transmissions may improve data processing and power consumption of the WTRU. However, because multiple uplink carriers are continuously transmitting on the uplink, even during the periods of inactivity, WTRU battery life may significantly decrease. Additionally, continuous DPCCH transmission on any secondary uplink carrier(s) may have a negative impact on system capacity.

While continuous packet connectivity (CPC) operations are implemented for single carrier uplink transmissions that help the WTRU decrease power consumption while in CELL_DCH, methods and apparatus for power control for multi-carrier uplink communications are desired.

SUMMARY

A method and apparatus for utilizing a plurality of uplink carriers and a plurality of downlink carriers are disclosed. A WTRU activates a primary uplink carrier and a primary downlink carrier and activates or deactivates a secondary uplink carrier based on an order from a network or upon detection of a pre-configured condition. The order may be a physical layer signal such as an HS-SCCH order.

The WTRU may deactivate a secondary downlink carrier upon deactivation of the secondary uplink carrier, or vice versa. The WTRU may activate the secondary uplink carrier upon activation of the secondary downlink carrier. The WTRU may deactivate/activate the secondary uplink carrier upon discontinuous transmission (DTX) activation/deactivation on the primary uplink carrier. The order may be transmitted via an HS-SCCH order or an E-AGCH message. The WTRU may deactivate the secondary uplink carrier based on inactivity of the E-DCH transmission, a buffer status, a channel condition, power constraints, or other similar triggers.

When the secondary uplink carrier is activated, DPCCH transmission may be initiated a predetermined time period prior to initiating the E-DCH transmissions on the secondary uplink carrier. The initial DPCCH transmission power on the secondary uplink carrier may be set based on a DPCCH transmission power on the primary uplink carrier or may be set to a value signaled by a network. A default grant value may be used for initial E-DCH transmission on the secondary uplink carrier upon activation of the secondary uplink carrier.

The same DTX status configured for the primary uplink carrier may be used for the secondary uplink carrier upon activation of the secondary uplink carrier. A DTX pattern for the primary uplink carrier and the secondary uplink carrier may be aligned or configured independently.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a machine-to-machine (M2M) device, a sensor, or any other type of device capable of operating in a wireless environment. When referred to hereafter, the terminology "Node-B" includes but is not limited to a base station, a site controller, an access point (AP), or any other type of interfacing device capable of operating in a wireless environment.

The network may assign at least one downlink and/or at least one uplink carrier as an anchor downlink carrier and an anchor uplink carrier, respectively. In multi-carrier operation a WTRU may be configured to operate with two or more carriers (also referred to as frequencies). Each of these carriers may have distinct characteristics and logical association with the network and the WTRU, and the operating frequencies may be grouped and referred to as anchor (or primary) carrier and supplementary (or secondary) carrier. Hereinafter, the terminologies "anchor carrier" and "primary carrier", and "supplementary carrier" and "secondary carrier" may be used interchangeably, respectively. If more than two carriers are configured the WTRU may contain more than one primary carrier and/or more than one secondary carrier(s). The embodiments described herein are applicable and may be extended to these scenarios as well. For example, the anchor carrier may be defined as the carrier for carrying a specific set of control information for downlink/ uplink transmissions. Any carrier that is not assigned as an anchor carrier may be a supplementary carrier. Alternatively, the network may not assign an anchor carrier and no priority, preference, or default status may be given to any downlink or uplink carriers. For multi-carrier operation more than one supplementary carriers or secondary carriers may exist.

Figure 1:
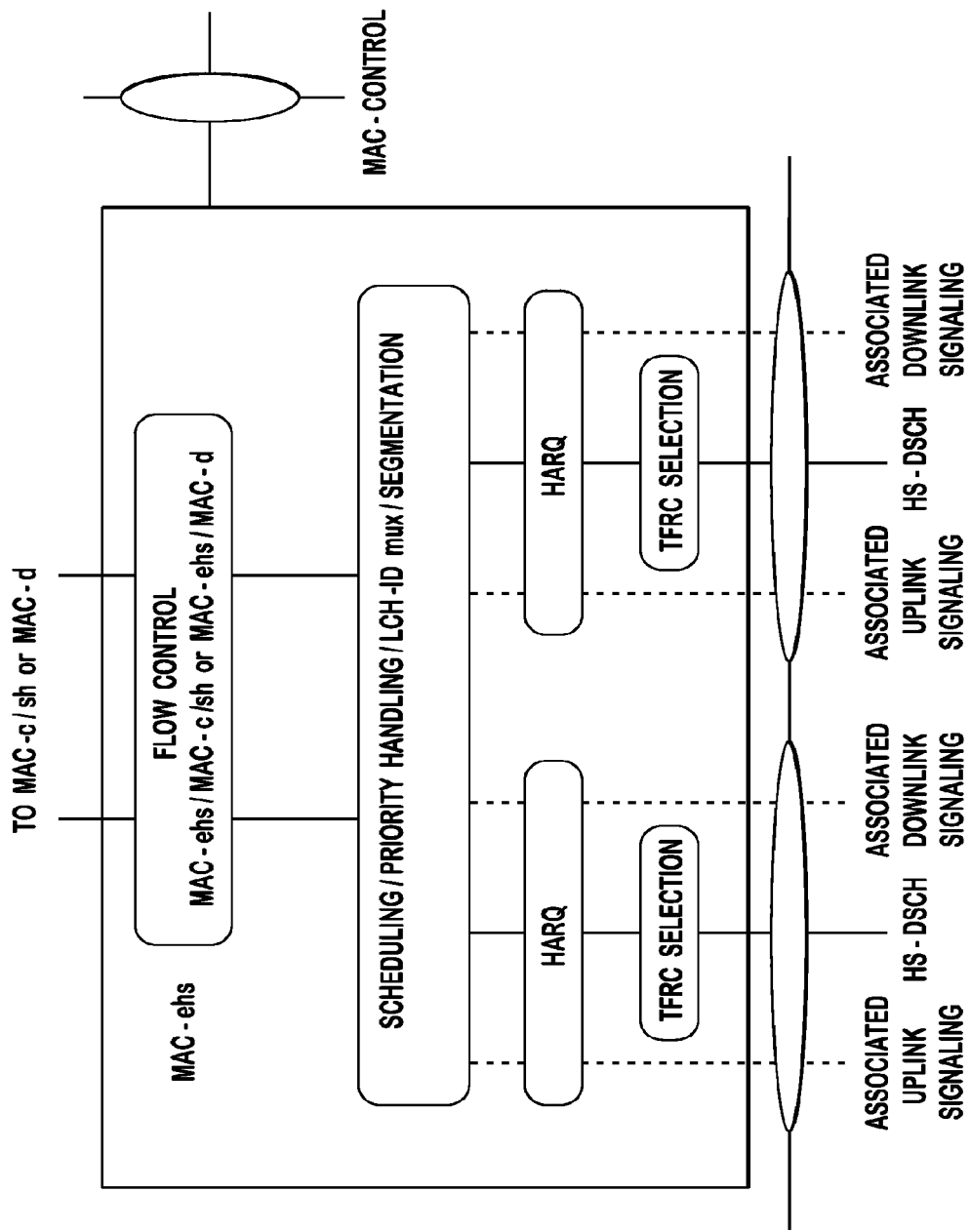
FIG. 1 shows a MAC layer structure for DC-HSDPA operation.
Figure 2:
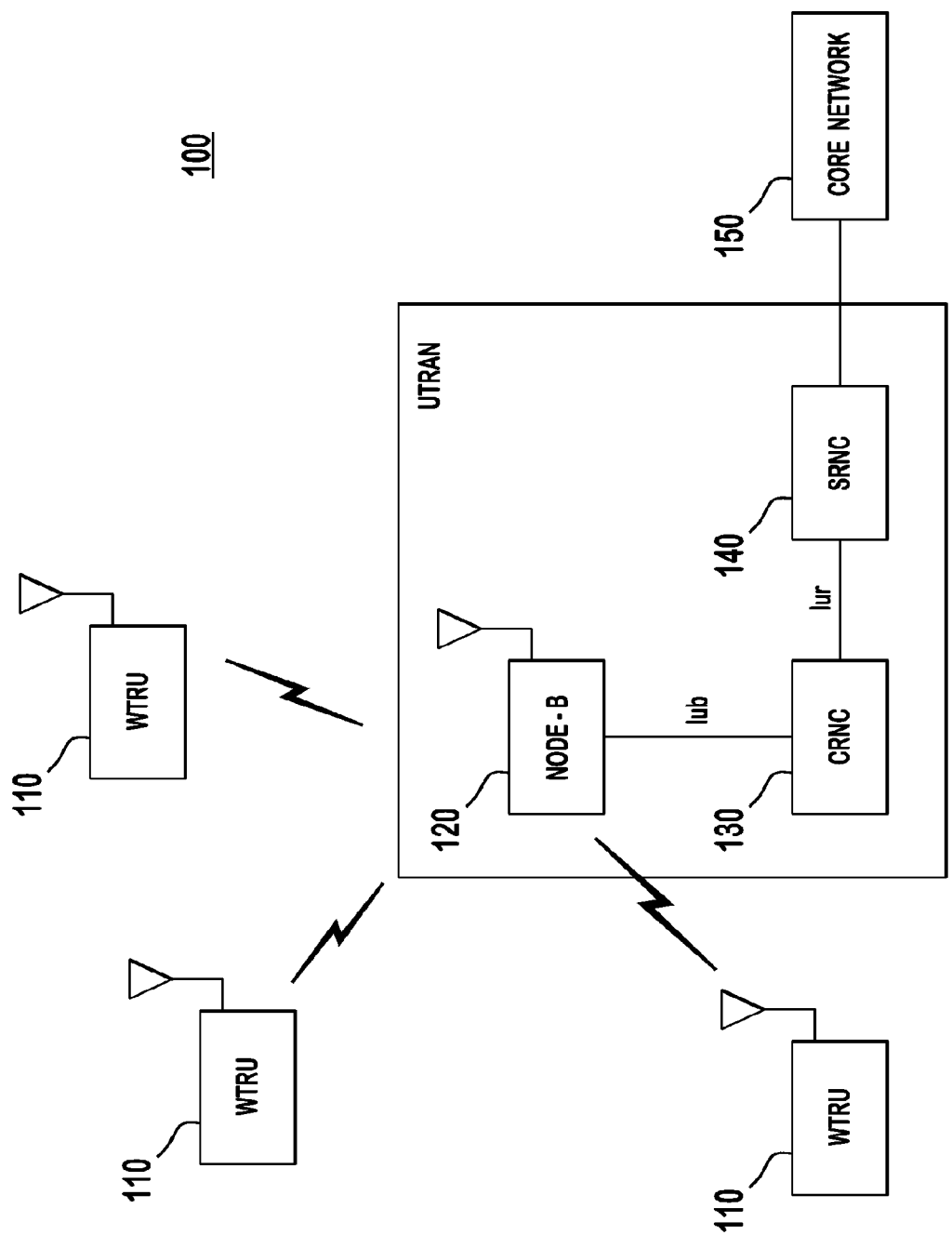
FIG. 2 shows an example wireless communication system.

FIG. 2 shows an example wireless communication system 100 including a plurality of WTRUs 110, a Node-B 120, a controlling radio network controller (CRNC) 130, a serving radio network controller (SRNC) 140, and a core network 150. The Node-B 120 and the CRNC 130 with the SRNC 140 may collectively be referred to as the UTRAN.

As shown in FIG. 2, the WTRUs 110 are in communication with the Node-B 120, which is in communication with the CRNC 130 and the SRNC 140. The communication between the WTRU 110 and the Node-B 120 may be performed via a plurality of downlink carriers (e.g., at least one primary downlink carrier and at least one secondary downlink carrier) and a plurality of uplink carriers (e.g., at least one primary uplink carrier and at least one secondary uplink carrier). Although three WTRUs 110, one Node-B 120, one CRNC 130, and one SRNC 140 are shown in FIG. 2, it should be noted that any combination of wireless and wired devices may be included in the wireless communication system 100.

Figure 3:
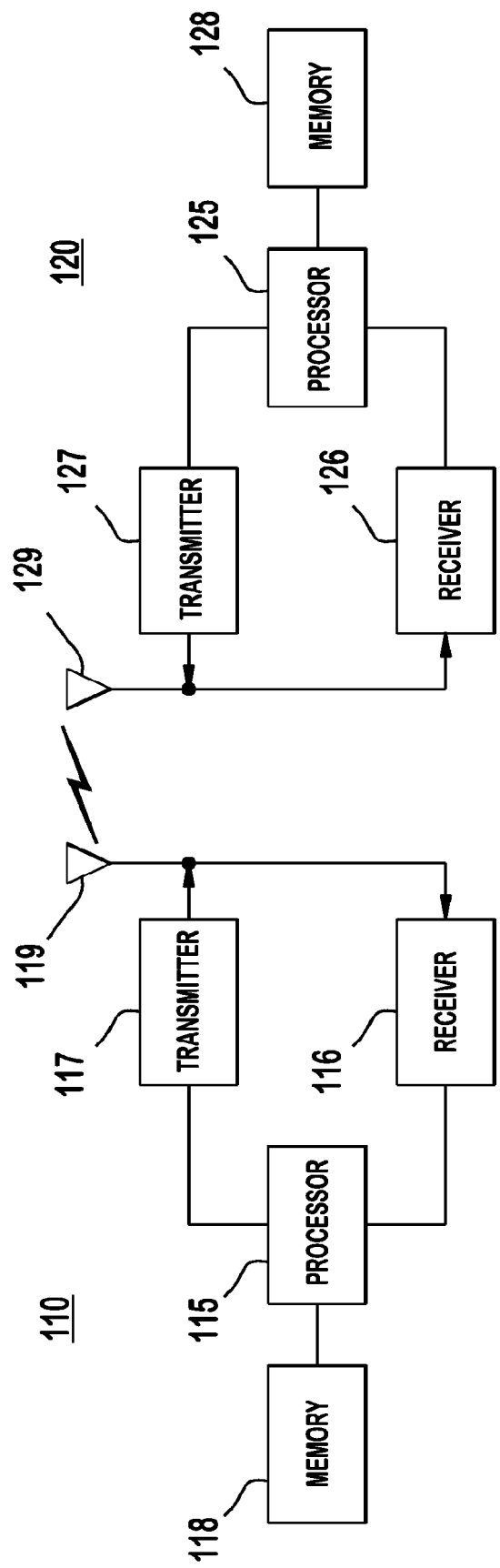
FIG. 3 is a functional block diagram of an example WTRU and an example Node-B of the wireless communication system of FIG. 2.

FIG. 3 is a functional block diagram of a WTRU 110 and the Node-B 120 of the wireless communication system 100 of FIG. 2. As shown in FIG. 3, the WTRU 110 is in communication with the Node-B 120 and both are configured to perform a method of performing uplink transmissions with multiple uplink carriers. The WTRU 110 includes a processor 115, a receiver 116, a transmitter 117, a memory 118, an antenna 119, and other components (not shown) that may be found in a typical WTRU. The memory 118 is provided to store software including operating system, application, etc. The processor 115 is provided to perform, alone or in association with the software, a method of performing uplink transmissions with multiple uplink carriers. The receiver 116 and the transmitter 117 are in communication with the processor 115. The receiver 116 and/or the transmitter 117 may be configured to receive and/or transmit on multiple carriers simultaneously, respectively. Alternatively, the WTRU 110 may include multiple receivers and/or transmitters. The antenna 119 is in communication with both the receiver 116 and the transmitter 117 to facilitate the transmission and reception of wireless data.

The Node-B 120 includes a processor 125, a receiver 126, a transmitter 127, an antenna 128, and other components (not shown) that may be found in a typical base station. The processor 125 is provided to perform, alone or in association with the software, a method of performing uplink transmissions with multiple uplink carriers. The receiver 126 and the transmitter 127 are in communication with the processor 125. The receiver 126 and/or the transmitter 127 may be configured to receive and/or transmit on multiple carriers simultaneously, respectively. Alternatively, the Node-B 120 may include multiple receivers and/or transmitters. The antenna 128 is in communication with both the receiver 126 and the transmitter 127 to facilitate the transmission and reception of wireless data.

It should be noted that although the embodiments described herein are described with reference to channels associated with HSPA+, the embodiments are applicable to any other multi-carrier systems (and the channels used therein) such as LTE Release 8 or later, and LTE-Advanced, as well as any other type of wireless communication systems, and the channels used therein. It should also be noted that the embodiments described herein may be applicable in any order or in any combination.

Embodiments for activation and deactivation of the secondary uplink carrier and discontinuous transmission (DTX) on the secondary uplink carrier are disclosed hereafter. The embodiments described hereafter may be used individually or in combination with other embodiments. It should be understood that even though the embodiments disclosed below are described in terms of two uplink carriers (one primary carrier and one secondary carrier), the embodiments may be extended to any number of uplink carriers. The secondary uplink carrier may be referred to as the secondary serving enhanced dedicated channel (E-DCH) cell. The secondary downlink carrier may be referred to as the secondary HS-DSCH serving cell.

Figure 4:
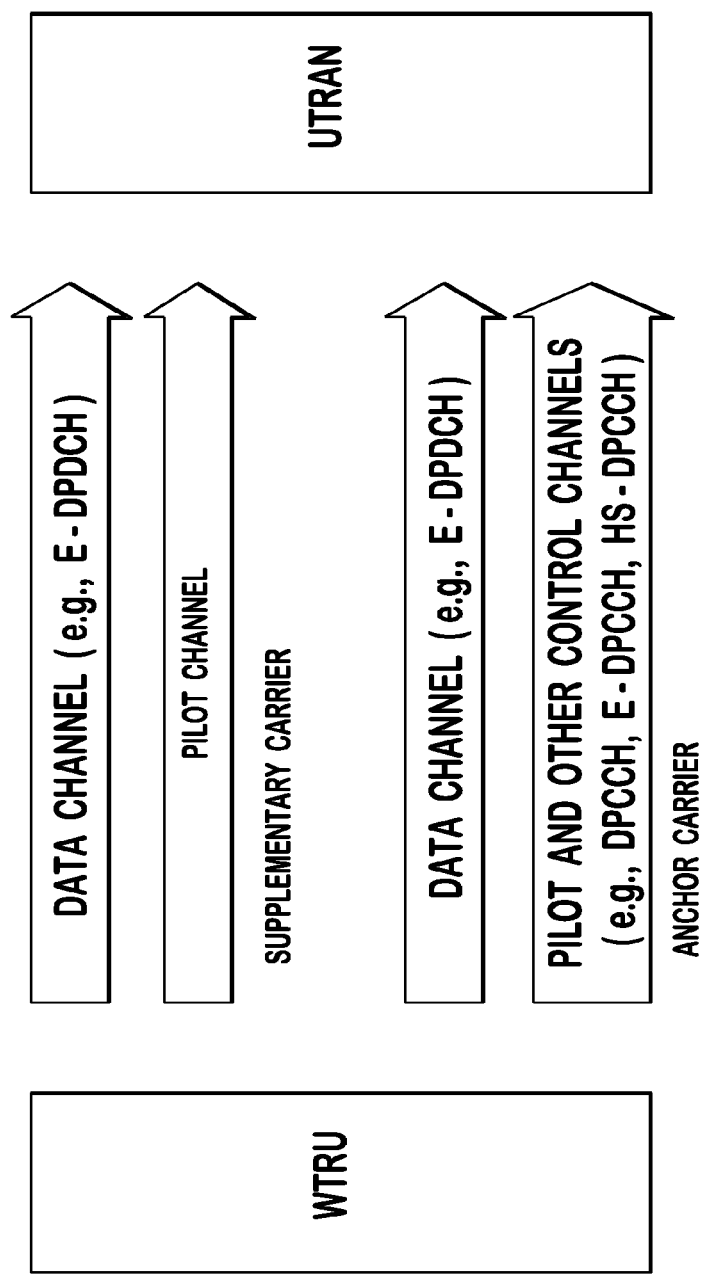
FIG. 4 shows an example WTRU configured to transmit two uplink carriers to the UTRAN in accordance with one embodiment.

FIG. 4 shows an example WTRU configured to transmit multiple uplink carriers to the UTRAN in accordance with one embodiment. The WTRU 110 may transmit a data channel(s), (e.g., E-DCH dedicated physical data channel (E-DPDCH)), and pilot and other control channels, (e.g., DPCCH, E-DCH dedicated physical control channel (E-DPCCH), and/or HS-DSCH dedicated physical control channel (HS-DPCCH)), on the anchor uplink carrier, and transmit a data channel (e.g., E-DPDCH) and a pilot channel on the supplementary uplink carrier.

The anchor uplink carrier may carry all or most of the uplink control signaling that is sent to the UTRAN. Examples of control signaling may include, but are not limited to: (1) feedback for downlink channels (such as HS-DPDCH) including channel quality information (CQI), precoding control indication (PCI), ACK/NACK HARQ information; (2) uplink radio link control information, (e.g., uplink DPCCH), including uplink pilot symbols, feedback information (FBI), and transmission power control (TPC) commands; or (3) E-DCH control information, (e.g., E-DPCCH), including retransmission sequence number (RSN) used for HARQ processing, E-DCH transport format combination index (E-TFCI) information indicating the size of the transmitted transport blocks, and a happy bit. The data channel, (e.g., E-DPDCH), may convey user traffic on the anchor uplink carrier as illustrated in FIG. 4.

Figure 5:
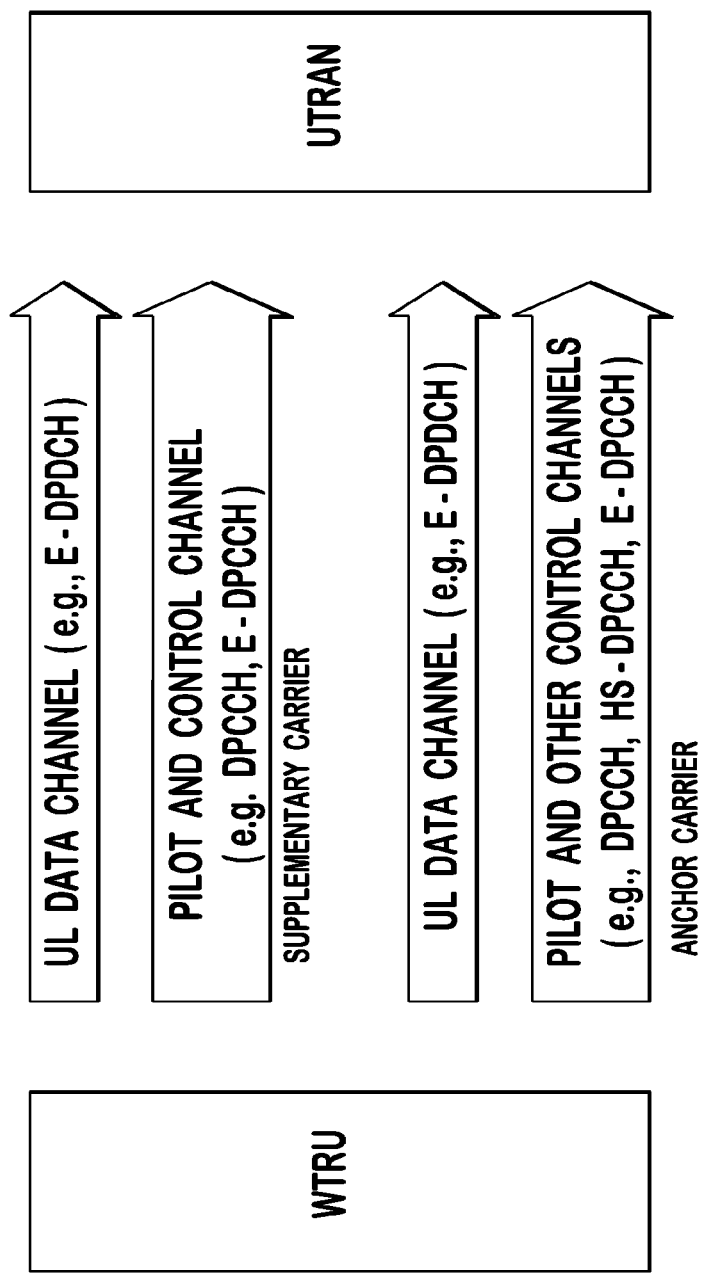
FIG. 5 shows an example WTRU configured to transmit two uplink carriers to the UTRAN in accordance with another embodiment.

Alternatively, the secondary uplink carrier may also carry the E-DCH control information that may be associated with the transmission of the secondary uplink carrier, as shown in FIG. 5. E-DCH control information transmitted on the anchor uplink carrier may be related to the data transmission on the anchor uplink carrier. A separate E-DPCCH may be sent on the secondary uplink carrier for transmitting the E-DCH control information in addition to the data and pilot channels (in a similar manner to single carrier operation).

Figure 6:
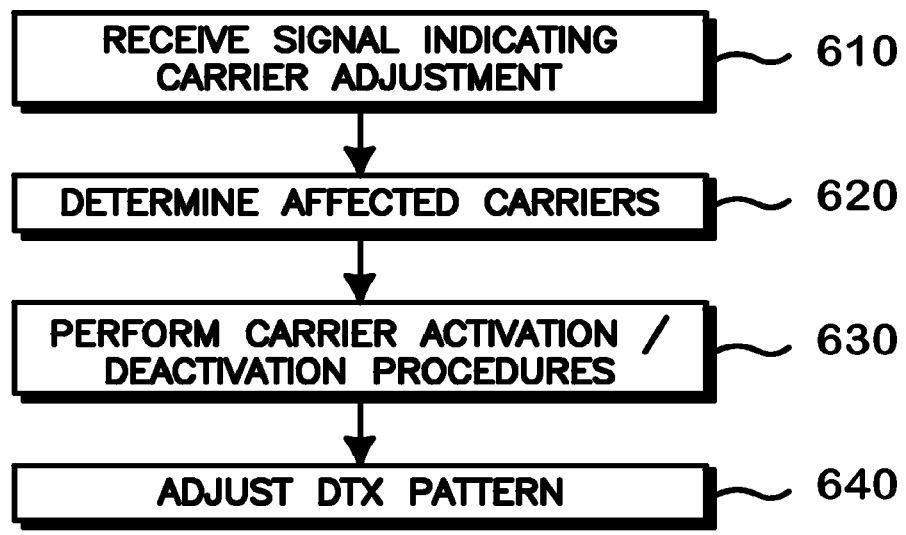
FIG. 6 is a flow diagram showing dynamic carrier adjustment in a WTRU.

FIG. 6 is a flow diagram showing dynamic carrier adjustment in a WTRU 110. The WTRU 110 may be configured to perform this dynamic carrier adjustment as a part of a power control procedure, to reduce data processing load in the WTRU 110, for traffic control in a communication network, or other network defined or predetermined reasons. As shown in FIG. 6, the WTRU 110 receives a signal indicating to the WTRU 110 to activate or deactivate a secondary carrier. In another alternative, the signal may indicate to the WTRU 110 to adjust an operating characteristic of the secondary carrier, such as transmit power adjustments, or DTX pattern or cycle adjustments, or the like. The signal may be explicitly signaled or implicitly signaled. Upon receiving the signal, the WTRU 110 determines which carriers to activate, deactivate, or modify and then performs the appropriate secondary activation, deactivation, or modification procedures. This may comprise accounting for ongoing or scheduled transmissions on the carriers. Upon activating, deactivating or modifying the secondary carriers, the WTRU 110 may then be configured to adjust the DTX patterns. While the embodiments described address the controlling the secondary carrier(s) it should be understood that the methods described may be applied to anchor carrier(s) as well.

In accordance with one embodiment, the WTRU 110 may be configured to receive an explicit signal notifying the WTRU 100 to activate or deactivate secondary uplink carrier(s) from the network. The explicit signaling may include, but is not limited to layer 1 signaling (e.g., HS-SCCH orders, E-AGCH signals), layer 2 signaling (e.g., messages in a MAC-ehs protocol data unit (PDU), E-RNTI, or MAC headers), or layer 3 signaling (e.g., RRC messages). Based on the signaling, the WTRU 110 may activate or deactivate its secondary carrier(s). By performing the dynamic control of the secondary uplink carrier(s), the WTRU 110 may be able to save transmission power.

In one embodiment, the network may explicitly signal the WTRU 110 to activate or deactivate the secondary uplink carrier via a conventional layer 1 signal, (e.g., a high speed shared control channel (HS-SCCH) order), or a new layer 1 signal. For example, a HS-SCCH order may be defined to activate or deactivate the secondary uplink carrier. The HS-SCCH order may be sent via the primary and/or secondary serving HS-DSCH cell. Upon reception of the layer 1 signal, (e.g., HS-SCCH order), the WTRU 110 activates or deactivates transmission on the secondary uplink carrier. The reception of the HS-SCCH order may also act as an implicit indication that the WTRU 110 stops monitoring the downlink control signaling such as the E-HICH, E-RGCH, E-AGCH associated to the secondary uplink carrier, if applicable. The HS-SCCH order may optionally indicate that the WTRU 110 stops monitoring the secondary downlink carrier.

The HS-SCCH order signal may comprise order type bits $x_{odt,1}$, $x_{odt,2}$, $x_{odt,3}$ and order bits $x_{ord,1}$, $x_{ord,2}$, $x_{ord,3}$. For example, if the order type bits $x_{odt,1}$, $x_{odt,2}$, $x_{odt,3}$='001', then the mapping for $x_{ord,1}$, $x_{ord,2}$, $x_{ord,3}$ may be defined as follows:

$x_{ord,1}$, $x_{ord,2}$, $x_{ord,3}$ may be comprised of:
  Reserved (1 bits): $x_{ord,1}=x_{res,1}$
  Secondary serving E-DCH cell activation (1 bit): $x_{ord,2}=x_{E-DCH\_secondary,1}$
  Secondary serving HS-DSCH cell activation (1 bit): $x_{ord,3}=x_{secondary,1}$
If $x_{E-DCH\_secondary,1}$='0', then the HS-SCCH order may be a secondary serving E-DCH cell de-activation order;
If $x_{E-DCH\_secondary,1}$='1', then the HS-SCCH order may be a secondary serving E-DCH cell activation order;
If $x_{secondary,1}$='0', then the HS-SCCH order may be a secondary serving HS-DSCH cell de-activation order; and
If $x_{secondary,1}$='1', then the HS-SCCH order may be a secondary serving HS-DSCH cell activation order.

Figure 7:
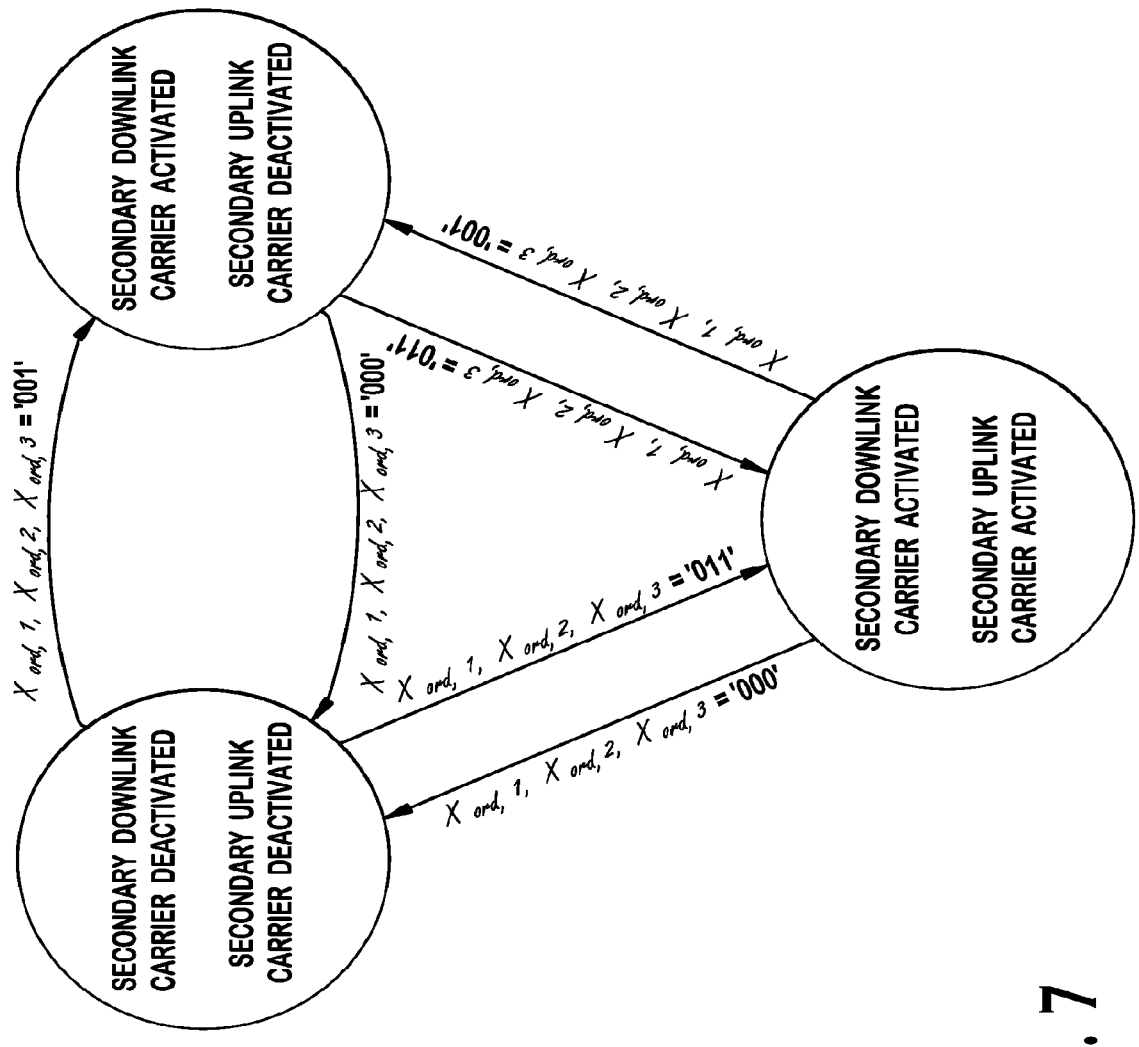
FIG. 7 shows example transitions among various states of carrier activation/deactivation in accordance with the HS-SCCH orders.

FIG. 7 shows example transitions among various states of carrier activation/deactivation in accordance with the HS-SCCH orders. An HS-SCCH order "000" makes the state transition to the state in which both the secondary serving E-DCH cell and the secondary HS-DSCH cell are deactivated. An HS-SCCH order "001" makes the state transition to the state in which the secondary serving E-DCH cell is deactivated and the secondary HS-DSCH cell is activated.

An HS-SCCH order "011" makes the state transition to a state in which both the secondary serving E-DCH cell and the secondary HS-DSCH cell are activated. A state in which the secondary serving E-DCH cell is activated and the secondary HS-DSCH cell is deactivated may be defined (not shown in FIG. 7) and an HS-SCCH order "010" may be used to transition to that state.

Alternatively, a new order type may be defined for this purpose. This alternative approach may be scalable to more than one uplink carrier. For example, if order type bits $x_{ord,1}$, $x_{ord,2}$, $x_{ord,3}$='010', then the mapping for $x_{ord,1}$, $x_{ord,2}$, $x_{ord,3}$ may be defined as follows:

$x_{ord,1}$, $x_{ord,2}$, $x_{ord,3}$ may be comprised of:
  Reserved (2 bits): $x_{ord,1}$, $x_{ord,2}$=$x_{res,1}$, $x_{res,2}$
  Secondary serving E-DCH cell activation (1 bit): $x_{ord,3}$=$x_{E-DCH\_secondary,1}$
  If $x_{E-DCH\_secondary,1}$='0', then the HS-SCCH order may be a secondary serving E-DCH cell de-activation order; and
  If $x_{E-DCH\_secondary,1}$='1', then the HS-SCCH order may be a secondary serving E-DCH cell activation order.

In another embodiment, an order received by the WTRU 110 may be used as explicit signaling to activate or deactivate any secondary uplink carrier(s). For example, an HS-SCCH order used to activate or deactivate the secondary downlink carrier may be used for activating or deactivating the secondary uplink carrier. An HS-SCCH order used to deactivate the secondary downlink carrier may implicitly order the WTRU 110 to also deactivate the secondary uplink carrier. Accordingly, when a secondary downlink carrier is deactivated by the network, the WTRU 110 may also deactivate a secondary uplink carrier. However, the HS-SCCH order to activate the secondary downlink carrier may not implicitly activate the secondary uplink carrier as well. Alternatively, the WTRU 110 may be configured to activate the secondary uplink carrier with secondary downlink carrier activation.

In another embodiment, the WTRU 110 may receive a DTX activation order for the primary uplink carrier which may implicitly deactivate the secondary uplink carrier. DTX deactivation may reactivate the secondary uplink carrier. Alternatively, an explicit activation order may be used to reactivate the secondary uplink carrier.

In accordance with another embodiment, the E-AGCH may be used to explicitly notify the WTRU 110 to deactivate or activate the secondary uplink carrier. For instance, the Node-B 120 may use the E-AGCH associated to the secondary uplink carrier, (or alternatively the E-AGCH associated to the primary carrier), to signal the absolute grant value set to 'INACTIVE', with the absolute grant scope set to "all HARQ processes", or alternatively the absolute grant value set to zero. Alternatively, a particular absolute grant value or a combination of an absolute grant value with an absolute grant scope may be reserved to signal deactivation or activation of the secondary uplink carrier. Upon reception of this absolute grant message the WTRU 110 deactivates the secondary uplink carrier.

Alternatively, an additional field(s) may be added to the absolute grant message. For example, this field may comprise one bit to indicate to the WTRU 110 to activate or deactivate the secondary uplink carrier. If this bit is set, the WTRU 110 may deactivate the secondary uplink carrier. This may be signaled on any of the E-AGCH used to control the scheduling for the primary uplink carrier or the secondary uplink carrier. Optionally, unsetting this bit on the E-AGCH for the primary uplink carrier while the secondary uplink carrier is deactivated, may indicate to the WTRU 110 to activate the secondary uplink carrier. In another embodiment, multiple bits may be added to the absolute grant, each bit corresponding to one or more supplementary carriers. Alternatively, other methods described herein may be used to activate the secondary uplink carrier.

Alternatively, a special value of the absolute grant value field may be used to indicate deactivation or activation of the secondary uplink carrier.

Alternatively, the absolute grant scope bit may be re-interpreted to indicate activation or deactivation of the secondary uplink carrier.

Alternatively, the WTRU 110 may use a layer 2 message to deactivate or activate the secondary uplink carrier. The layer 2 message may be included in a MAC-ehs protocol data unit (PDU). For example, a special value of the logical channel identity (LCH-ID) field may be used to indicate the presence of this message, optionally followed by four (4) spare bits, where two of the four spare bits may be reserved to indicate activation or deactivation of the secondary uplink carrier.

Alternatively, a separate E-RNTI may be allocated to the WTRU and used to indicate deactivation or activation of the secondary uplink carrier over the E-AGCH. If the secondary uplink carrier is activated or deactivated, the E-AGCH may be masked with the special E-RNTI. Upon detection of this E-AGCH with the special E-RNTI, the WTRU 110 activates or deactivates the secondary uplink carrier. The absolute grant value in this E-AGCH transmission may, for instance, be set to "zero" or "inactive" when signaling a deactivation order. When re-enabling the secondary uplink carrier, the absolute grant value of this E-AGCH transmission may be set to the value the network assigns the WTRU 110 to use for initial E-DCH transmission when the secondary uplink carrier is activated.

An indication to deactivate or activate the secondary uplink carrier(s) using layer 1 or layer 2 signaling may originate from the serving Node-B 120. Since other Node-Bs in the active set of the WTRU 110 may also be monitoring the secondary uplink channel from the WTRU, the other Node-Bs would benefit from an indication that the WTRU 110 may be deactivating or activating the secondary uplink carrier(s). The indication of the deactivation or activation may be an acknowledgment of the deactivation or activation order from the network, or indication of the WTRU-initiated or WTRU-assisted deactivation or activation. In accordance with one embodiment, the WTRU 110 may send an indication in the uplink that the secondary uplink carrier(s) is deactivated or activated.

The indication may be realized in any of the following ways. A special or reserved value of the E-DCH transport format combination index (E-TFCI) may be transmitted in the uplink via the E-DPCCH. The WTRU 110 may send the special E-TFCI when there is no data to transmit on the corresponding uplink carrier, (i.e., E-DPDCH is not transmitted).

Alternatively, the happy bit of the E-DPCCH in the secondary uplink carrier may be used to signal this indication. The happy bit may be implemented as a flag related to a rate request on a control channel (e.g., E-DPCCH) and the scheduling information (SI). The happy-bit may be transmitted in-band (e.g., on the E-DCH). The happy bit may be re-used and re-interpreted to indicate the deactivation or activation of the secondary uplink carrier. For example, a happy bit sent on a channel of the secondary uplink carrier (e.g., E-DPCCH) may indicate to other Node-Bs that the secondary carrier may be deactivated, rather than indicating a state of happiness, since the indication of happiness may be sent over the anchor carrier, or alternatively another secondary carrier. In multi-carrier systems with more than two carriers, one or more happy bits may be used.

Alternatively, a special value of the scheduling information (SI) may be used to indicate that the WTRU 110 has deactivated, or is going to deactivate, the secondary uplink carrier. For instance, the value of total E-DCH buffer status (TEBS) set to zero may be used to report implicit deactivation of the secondary uplink carrier. Alternatively, the WTRU 110 may use power headroom of zero to indicate implicit deactivation of the secondary uplink carrier. If two power headroom fields are present in the SI field, the WTRU 110 may report power headroom of zero for the secondary uplink carrier. Alternatively, a TEBS value that may be lower than a pre-configured threshold may also signal the deactivation of the secondary uplink carrier. Alternatively, a special reserved value of the highest logical channel identity (HLID) or highest priority logical channel buffer status (HLBS) may be used to indicate deactivation or activation of the secondary uplink carrier.

Alternatively, layer 2 signaling in the MAC-i header using the special value of the LCH-ID field and using, for example, one or two values of the four spare bits may be used to indicate the deactivation of the secondary uplink carrier.

Alternatively, the serving Node-B 120 may signal to all cells in the active set that the secondary uplink carrier has been deactivated or may be deactivated a number of TTIs from the transmission of the indication. By way of example, the signaling procedures for indicating that the secondary uplink carrier has been deactivated or activated may be realized using Node-B application part (NBAP) (Iub) and radio network subsystem application part (RNSAP) (Iur) protocols as shown in FIGS. 8 and 9.

Figure 8:
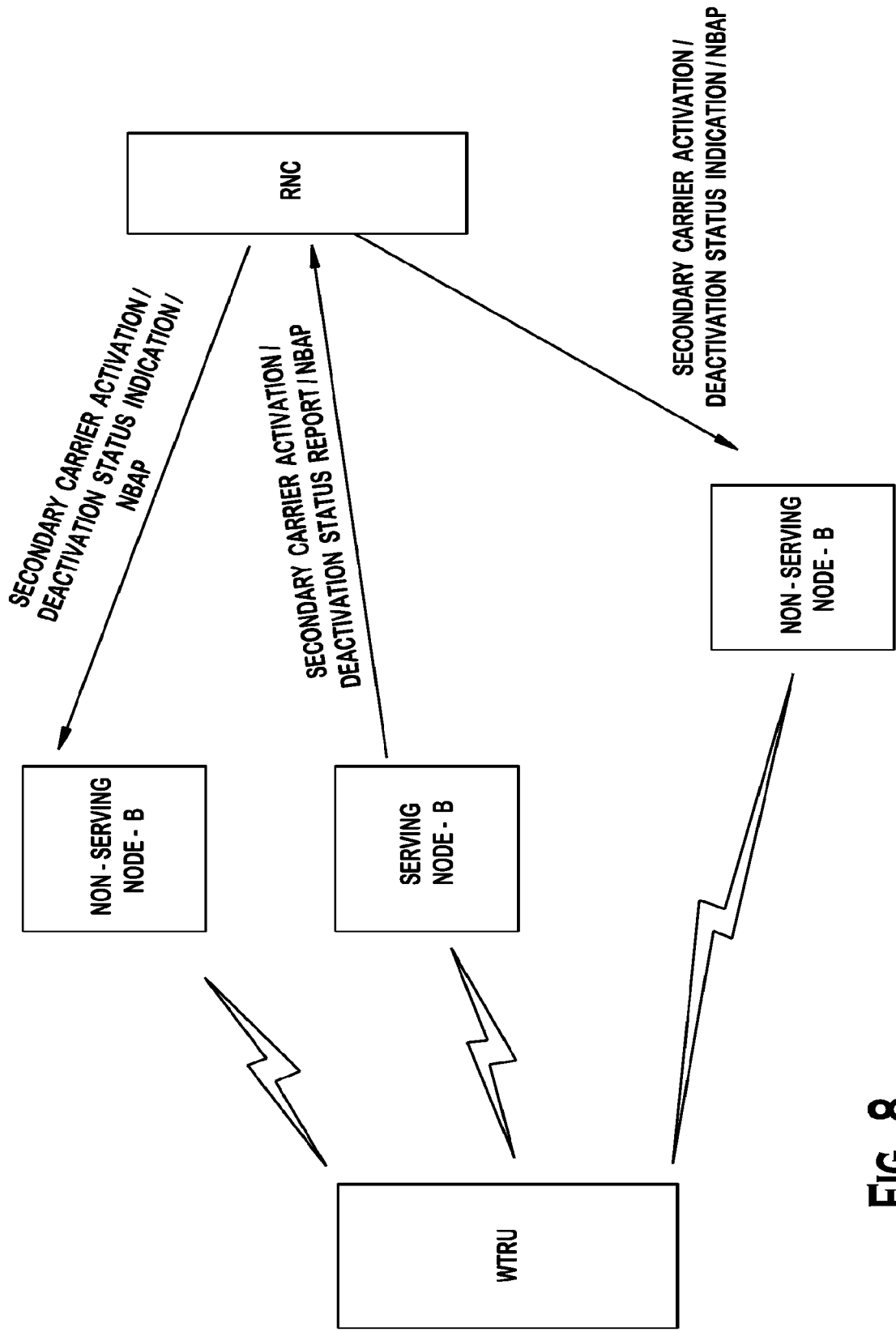
FIG. 8 shows signaling of the indication of secondary uplink carrier activation/deactivation using NBAP.
Figure 9:
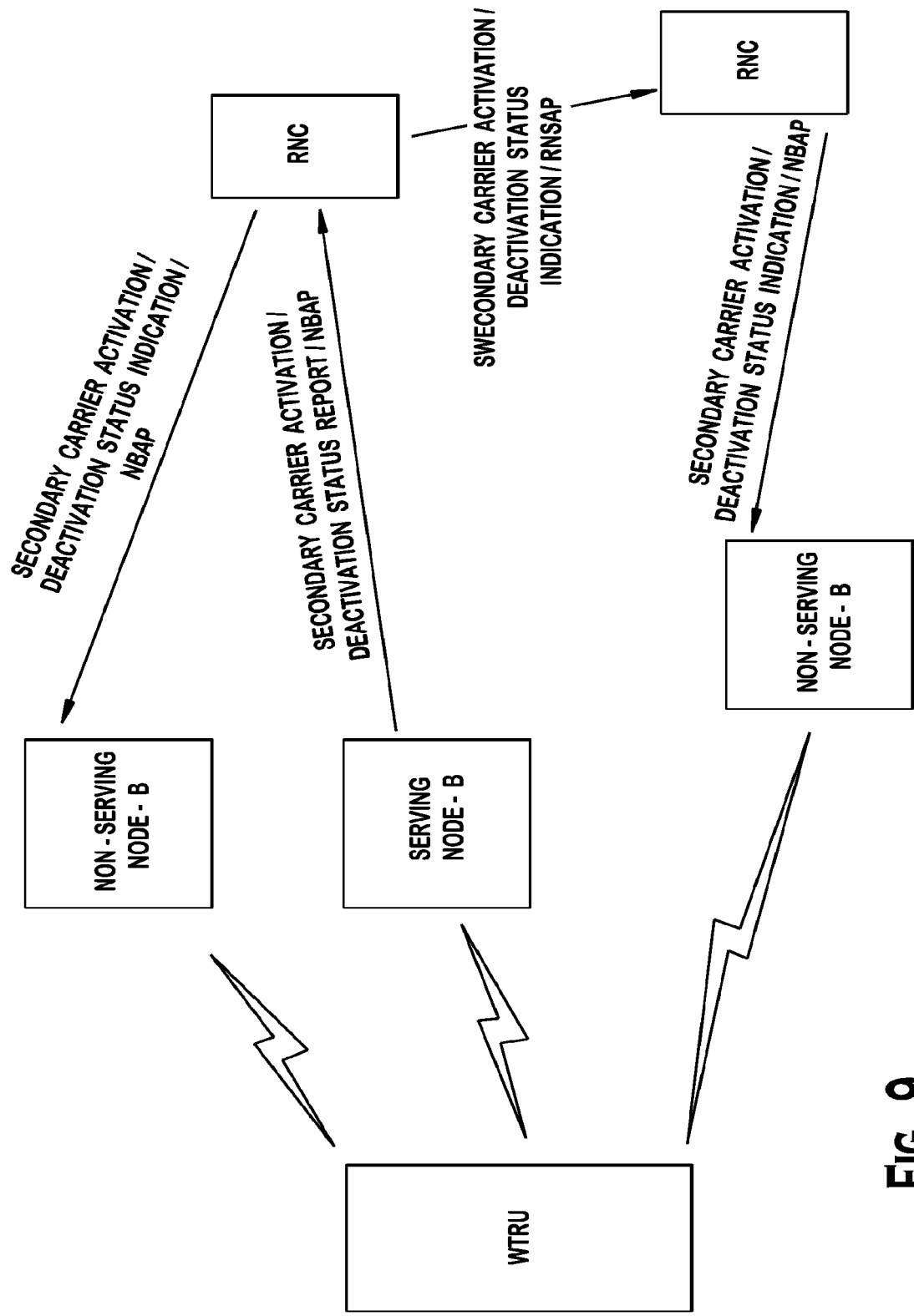
FIG. 9 shows signaling of the indication of secondary uplink carrier activation/deactivation using NBAP and RNSAP.

FIG. 8 shows signaling of the indication of secondary uplink carrier activation/deactivation using NBAP. In FIG. 8, the serving Node B sends an activation/deactivation status report indicating that the secondary uplink carrier for a particular WTRU has been activated or deactivated over NBAP (Iub) to the RNC, and the RNC forwards it to non-serving Node-Bs in the active set through NBAP. FIG. 9 shows signaling of the indication of secondary uplink carrier activation/deactivation using NBAP and RNSAP. In FIG. 9, two radio network subsystems (RNSs) are involved. The serving Node-B sends an activation/deactivation status report indicating that the secondary uplink carrier for a particular WTRU has been activated or deactivated over NBAP (Iub) to the RNC that controls the serving Node-B. The RNC then forwards it to non-serving Node-Bs in the active set that are controlled by the RNC over NBAP. The RNC also forwards it to other non-serving Node-Bs in the active set that are controlled by a different RNC over RNSAP (e.g., Iur interface).

Alternatively, an activation time may be indicated to all non-serving Node-Bs and, optionally, to the WTRU 110 as well. For instance, once a deactivation or activation order is sent to the WTRU 110 the serving Node-B 120 may notify it to other non-serving Node-Bs. The time at which the WTRU 110 acts to the received order may be long enough to ensure that all neighboring Node-Bs received the indication via Iub. A certain Iub and/or Iur latency requirement may be assumed. Alternatively, the serving Node-B 120 may notify the non-serving Node-Bs first and then sends an order or other layer 1/layer 2 signaling to the WTRU 110.

Alternatively, if the secondary DPCCH contains some spare bits, the WTRU 110 may use one of the spare bits of the secondary DPCCH to indicate the deactivation of the secondary uplink carrier. This may ensure that even the cells that are not part of the E-DCH active set, (i.e., the DCH active set), may receive this indication.

Alternatively, if the SI is sent on both uplink carriers and if the SI in the secondary uplink carrier contains spare bits, the WTRU 110 may use these spare bits to signal the activation of the secondary uplink carrier.

The problem with the usage of unused spare bits or unused fields in the channels belonging to the secondary uplink carrier is that these bits or fields may not be used to indicate the reactivation of the secondary uplink carrier. Therefore, in such cases the activation of the secondary uplink carrier may be signaled using other methods described above, which ensure that all Node-Bs may receive the indication on the anchor carrier.

The deactivation indication may be sent by the WTRU 110 on any of the uplink carriers: the primary carrier or the secondary carrier. Alternatively, the deactivation indication may be transmitted on the primary uplink carrier or on the uplink carrier that is being deactivated, (i.e., secondary uplink carrier).

Similarly, the WTRU 110 may send an indication of re-activation of the secondary uplink carrier when it is ordered by the serving Node-B 120 to re-activate transmissions on the secondary uplink carrier. The re-activation indication may be sent in a similar manner as the deactivation indication. The re-activation indication may be sent on the primary carrier. Alternatively, the serving Node-B may signal to all cells in the active set that a secondary uplink carrier has been activated. By way of example, the signaling procedures for indicating that the secondary carrier has been deactivated may be realized using NBAP (Iub) and RNSAP (Iur) RAN protocols as explained above.

Once a deactivation/activation indication is sent to the Node-Bs in the E-DCH active set, the WTRU 110 may wait for an acknowledgment. The current E-DCH operation allows the WTRU 110 to consider the transmission of a PDU successful as soon as an ACK is received from any of the cells. In order to ensure that all Node-Bs in the E-DCH active set received the indication, the WTRU 110 may wait to receive an ACK from at least one cell in each Radio Link Set (RLS) (i.e., each Node-B). The WTRU 110 may consider the hybrid automatic repeat request (HARQ) transmission successful if an ACK is received from at least one of the cells of each RLS, otherwise a HARQ retransmission is triggered. If no ACKs are received from at least one of the RLS and the indication has exceeded the maximum number of HARQ retransmissions, the WTRU 110 may declare the transmission of the indication unsuccessful and trigger a new transmission of the indication. For instance, if the SI is used to indicate activation/deactivation and according to the criteria specified above the WTRU 110 fails to successfully transmit this SI to all Node-Bs, then the SI may be triggered again.

Alternatively, the WTRU 110 may be configured to repeatedly send the indication for a pre-configured amount of time. For instance, the WTRU 110 may send the indication for a determined number of consecutive TTIs to ensure that all Node-Bs receive the indication.

Figure 10:
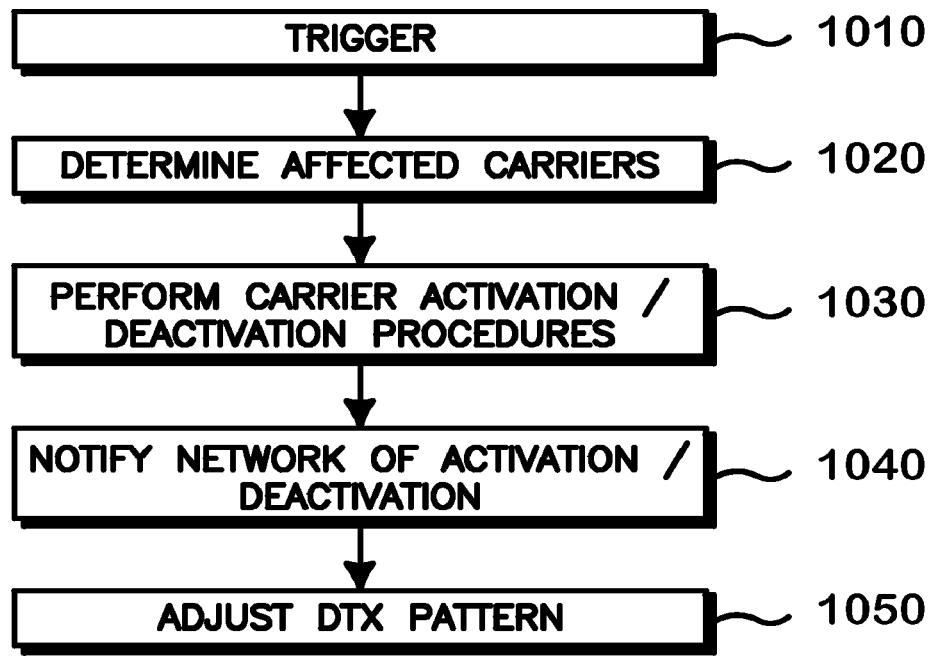
FIG. 10 is a flow diagram showing a method for autonomous dynamic carrier adjustment in a WTRU.

FIG. 10 is a flow diagram showing a method for autonomous dynamic carrier adjustment in a WTRU 110. The WTRU 110 may be configured to autonomously or implicitly activate and deactivate any secondary uplink carrier(s) without an explicit order or signal from the network. A trigger indicates to the WTRU 110 that a secondary carrier needs to be activated, deactivated or modified (1010). The trigger, for example, may be based on inactivity timers, buffer status, channel conditions, battery usage, or location based conditions. The WTRU 110 determines the affected carriers (1020). For example, in the case of dual carriers, the WTRU 110 may automatically know that it affects only the secondary carrier. The WTRU 110 then performs procedures for activation, deactivation, or modification of the determined secondary carriers (1030). The WTRU 110 notifies the network that a carrier has been activated or deactivated (1040). The WTRU then adjusts the carriers and determines a new DTX pattern. Alternatively, the DTX pattern may be signaled by the network.

The WTRU 110 may be configured with an inactivity timer or an inactivity threshold that may be defined in terms of transmission time intervals (TTIs). The inactivity threshold defines the time or the number of consecutive TTIs where the WTRU 110 did not have any E-DCH transmissions. When the inactivity of the E-DCH transmission reaches or exceeds the inactivity threshold or the inactivity timer expires, the WTRU 110 deactivates the secondary uplink carrier. The inactivity of the E-DCH transmissions may refer to no E-DCH transmissions on the secondary uplink carrier or alternatively may refer to no E-DCH transmissions on any of the uplink carriers.

The inactivity timer may be initiated or the inactivity threshold may be monitored at all times (i.e., even if the WTRU 110 is in continuous transmission mode). Alternatively, the inactivity timer may be monitored if the WTRU 110 is in WTRU_DTX_cycle_1 or, alternatively, after the WTRU 110 has moved to WTRU_DTX_cycle_2. WTRU_DTX_cycle_2 is longer than the WTRU_DTX_cycle_1 and the WTRU_DTX_cycle_2 is triggered after a configured inactivity period while in WTRU_DTX_cycle_1. Alternatively, the de-activation of the secondary uplink carrier may correspond directly to the DTX timing configured for the primary uplink carrier, (e.g., same timer is used). In this case, the WTRU 110 deactivates the secondary uplink carrier when DTX is started on the primary uplink carrier. Alternatively, the WTRU 110 may deactivate the secondary carrier when DTX cycle 2 starts on the anchor carrier, (i.e., the inactivity timer for starting DTX cycle 2 expires).

Alternatively, the buffer status of the WTRU 110 may act as an implicit trigger for de-activating or activating the secondary uplink carrier. The WTRU 110 may be configured with a predetermined total E-DCH buffer status (TEBS) threshold, which the WTRU 110 may monitor. If the buffer status of the WTRU 110 is equal to or falls below the TEBS threshold, the WTRU 110 may de-activate the secondary uplink carrier. Alternatively, a TEBS threshold combined with a trigger timer may be used. For example, if the TEBS value is equal to or below the TEBS threshold for the duration of the trigger timer, the WTRU 110 may deactivate the secondary uplink carrier.

Additionally, the WTRU 110 may use an activation TEBS threshold to activate the secondary uplink carrier. For example, if the TEBS value goes above the activation TEBS threshold, optionally for a pre-configured period of time, the WTRU 110 may re-activate the secondary uplink carrier. This activation trigger may be applicable to any of the embodiments disclosed above, regardless of the method used to deactivate the secondary uplink carrier.

Alternatively, the WTRU 110 may deactivate the secondary uplink carrier based on channel conditions and/or power constraints. For example, as the WTRU 110 moves towards a cell edge and becomes power limited, the WTRU 110 may autonomously deactivate the secondary uplink carrier. This may be justified by the fact that there is little or no gain for the WTRU 110 in utilizing a larger bandwidth if it is limited by its maximum transmission power.

Deactivation of the secondary uplink carrier may be triggered if the uplink power headroom of one, both, any, or a combination of the uplink carriers goes below a certain threshold, optionally for a configured amount of time. Alternatively, deactivation of the secondary uplink carrier may be triggered if the received power of the common pilot channel (CPICH) from the primary downlink carrier falls below a certain threshold. The received power of the CPICH from any downlink carrier may be used. Alternatively, deactivation of the secondary uplink carrier may also be triggered if the WTRU 110 receives a predetermined number of successive increase (i.e. UP) power control commands from the serving Node-B 120 on one, both, or any of the carriers. Alternatively, deactivation of the secondary uplink carrier may be triggered if the WTRU 110 has enough data and grant to fully utilize the power headroom on the anchor carrier (i.e., the WTRU 110 is limited by its maximum transmission power). Alternatively, deactivation of the secondary uplink carrier maybe triggered if the power headroom on the secondary uplink carrier is smaller than the power headroom on the anchor uplink carrier. Alternatively, deactivation of the secondary uplink carrier may be triggered if the WTRU 110 has not been able to transmit any data on the secondary uplink carrier for a pre-configured amount of time, due to power limitations in the secondary uplink carrier. It should be noted that the thresholds described above may be predefined or configured by a higher layer, such as radio resource control (RRC) layer.

Upon autonomously deactivating the secondary uplink carrier, the WTRU 110 may send an indication to the network to signal the deactivation of the secondary uplink carrier. This may be performed using one or a combination of the following methods or additionally using one or a combination of the methods for deactivation indication described above. A special value of the SI may be used to indicate that the WTRU 110 has deactivated, or is going to deactivate, the secondary uplink carrier. For instance, the value of TEBS set to zero may be used to report implicit deactivation of the secondary uplink carrier. Alternatively, the WTRU 110 may use power headroom of zero to indicate implicit deactivation of the secondary uplink carrier. If two power headroom fields are present in the SI field, the WTRU 110 may report power headroom of zero for the secondary uplink carrier. Alternatively, the TEBS value lower than a configured threshold may be used as an indication.

Alternatively, layer 2 signaling in the MAC-i header using the special value of the LCH-ID field and using, for example, one or two values of the 4 spare bits may be used to indicate the deactivation of the secondary uplink carrier. Alternatively, a special or reserved value of the E-TFCI may be transmitted on the E-DPCCH. The WTRU 110 may send the special E-TFCI when there is no data to transmit on the corresponding uplink carrier (i.e., E-DPDCH is not transmitted).

The de-activation indication may be sent by the WTRU 110 on any of the uplink carriers: the primary carrier or the secondary carrier. Alternatively, the de-activation indication may be transmitted on the primary carrier or on the carrier that is being deactivated (i.e., secondary uplink carrier).

Alternatively, the WTRU 110 may deactivate the secondary uplink carrier without indicating it to the network.

For all the embodiments disclosed above the WTRU 110 may deactivate the secondary uplink carrier a determined number of slots or a determined number of TTIs after receptions of the explicit indication or after the triggering of the implicit criteria. The time for activation or deactivation may take into account the time to send an acknowledgment or indication to the network and optionally the time for all Node-Bs to be notified via Iub signaling.

For the implicit triggering, where the WTRU 110 sends an indication to the network, the WTRU 110 may wait until an ACK is received for the given message prior to deactivating the secondary uplink carrier. Optionally, the WTRU 110 may wait a determined number of slots or a determined number of TTIs prior to activating or deactivating the secondary uplink carrier after an ACK is received. The deactivation may be acknowledged as described above. For instance, the WTRU 110 may wait to receive an ACK from at least one cell from each RLS.

The uplink and downlink secondary carriers may be activated and de-activated in coordination. In accordance with one embodiment, the secondary uplink carrier may be activated upon activation of the secondary downlink carrier according to any trigger for activating the secondary downlink carrier (e.g., HS-SCCH order). This activation may take place even if no data needs to be transmitted on the uplink, as the purpose may be to provide HS-DPCCH feedback for the secondary downlink carrier. The activation may take place a certain number of sub-frames after activation of the secondary downlink carrier.

In accordance with another embodiment, the secondary uplink carrier may be de-activated upon de-activation of the secondary downlink carrier according to any trigger for de-activating the secondary downlink carrier, (e.g., HS-SCCH order). The de-activation of the secondary uplink carrier may require as an additional condition that no data transmission is on-going in the uplink direction (i.e., E-DCH) on the secondary uplink carrier, and/or that the WTRU 110 buffer is empty.

In accordance with another embodiment, the secondary downlink carrier may be activated upon activation of the secondary uplink carrier according to any previously defined trigger for activating the secondary uplink carrier, (e.g., HS-SCCH order). This activation may take place even if no data needs to be transmitted on the downlink, as the purpose may be to provide downlink control channels for the secondary uplink carrier. The activation may take place a certain number of sub-frames after activation of the secondary uplink carrier.

In accordance with another embodiment, the secondary downlink carrier may be de-activated upon de-activation of the secondary uplink carrier according to any trigger for de-activating the secondary uplink carrier, (e.g., HS-SCCH order). The de-activation of the secondary downlink carrier may require as an additional condition that no data transmission is on-going in the downlink direction (i.e., HS-DSCH) on the secondary downlink carrier.

In accordance with another embodiment, both uplink and downlink carriers may be both activated or de-activated by a single trigger. The trigger may be the reception of an HS-SCCH order indicating the activation or de-activation of both carriers. This may be achieved, for instance, by defining a new HS-SCCH order type. Alternatively, the trigger may be the reception of an E-AGCH signal indicating the activation or de-activation of both carriers. Such E-AGCH signal may, for example, comprise the combination of bits corresponding to "INACTIVE", or combination corresponding to "zero grant" with the scope bit set to "all HARQ processes." A distinct E-RNTI value may be used to indicate that the signal is intended to activate or de-activate both the uplink and downlink carriers. For the de-activation of both carriers, the trigger may be that the uplink buffer status of the WTRU 110 has been lower than a threshold (or zero) for a pre-determined amount of time, and no data has been received on the secondary carrier for a pre-determined amount of time. For the activation of both carriers, the trigger may be that the uplink buffer status of the WTRU 110 has been higher than a threshold (or zero) for a pre-determined amount of time, or an amount of data higher than a pre-determined threshold has been received on the anchor downlink carrier within a pre-determined amount of time.

Figure 11:
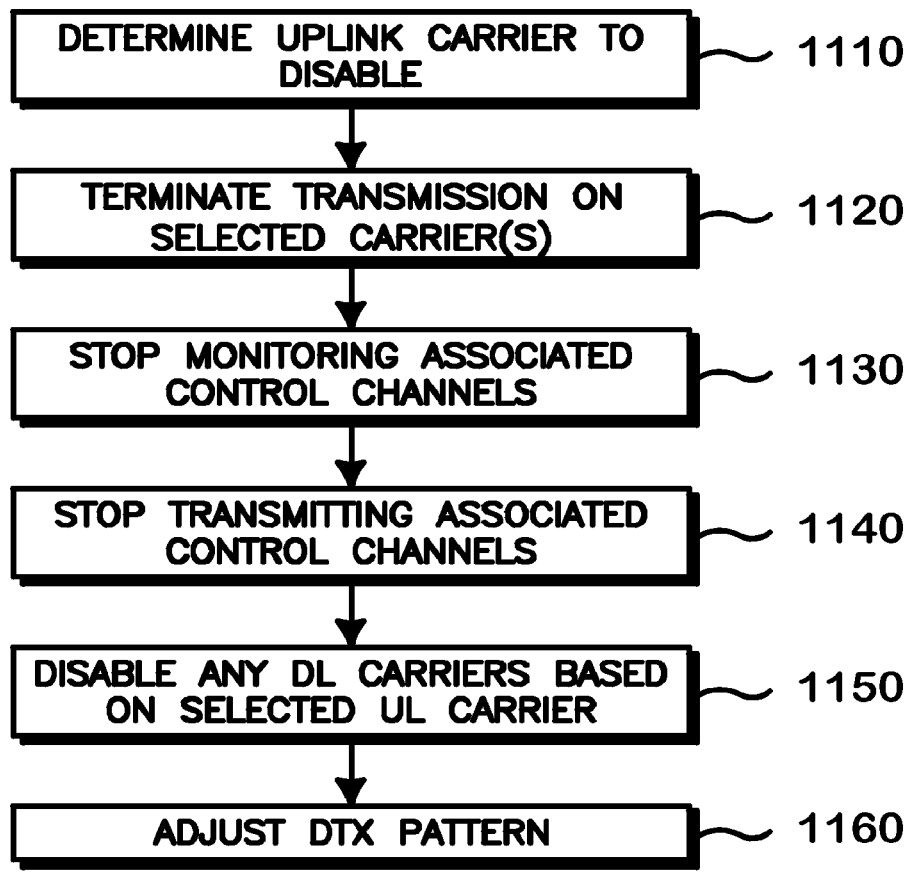
FIG. 11 is a flow diagram illustrating procedures associated with deactivating a secondary uplink carrier.

FIG. 11 is a flow diagram illustrating procedures associated with deactivating a secondary uplink carrier. The methods may be applied to all secondary uplink carriers. Alternatively, each secondary uplink carrier may have a separate procedure that is determined by the WTRU 110 or signaled by the network. Upon receiving a signal or a trigger, the WTRU 110 selects which uplink carrier(s) to deactivate. Transmissions on the selected carrier(s) are terminated (1110). The transmissions may be terminated immediately, after a predetermined time period, or after the conclusion of any transmissions scheduled prior to the deactivation signal (1120). The WTRU 110 then stops monitoring any associated control channels (1130). The WTRU 110 may stop transmission of any associated control channels (1140). The WTRU 110 may further deactivate selected downlink carriers, which may be determined based on explicit signaling, implicit signaling or autonomously (1150). Once the secondary carrier(s) are deactivated, the WTRU 110 may reconfigure the DTX pattern (1160).

When deactivating the secondary uplink carrier using one of the embodiments described above or any other methods, the WTRU 110 may stop transmitting the secondary uplink DPCCH or any uplink control signal used for the secondary uplink carrier, and/or may stop monitoring and stop reception of the E-HICH, E-RGCH, and E-AGCH associated to the secondary uplink carrier, if applicable. In addition, the WTRU 110 may flush the HARQ entity associated to the supplementary carrier. If the WTRU 110 is configured to send on an HS-DPCCH on each uplink carrier for downlink operation, the WTRU 110 may stop transmission of HS-DPCCH on the secondary uplink carrier. If DC-HSDPA is still activated, the WTRU 110 may start transmitting HS-DPCCH for the secondary downlink carrier on the primary uplink carrier using a separate HS-DPCCH code or alternatively on one code for each carrier using 3GPP Release 8 HS-DPCCH code formatting. Optionally, the WTRU 110 may also autonomously deactivate the secondary downlink carrier as well when the secondary uplink carrier is deactivated.

In addition, the following actions may occur when the de-activation occurs through RRC signaling. The WTRU 110 may stop E-DCH transmission and reception procedures on the supplementary carrier, flush the HARQ entity associated to the supplementary carrier, release the HARQ processes of the HARQ entity associated to the supplementary carrier, and/or clear E-RNTI value(s) associated to the secondary carrier.

Figure 12:
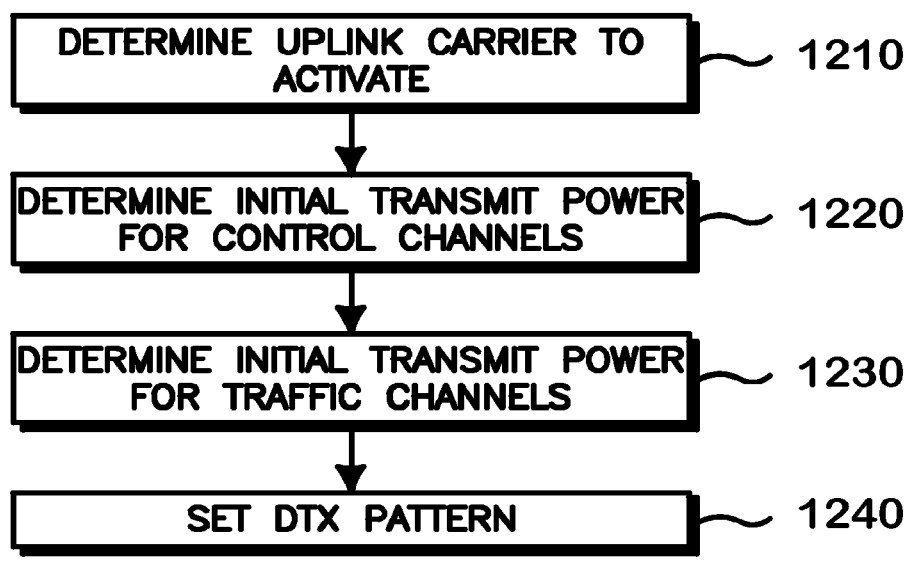
FIG. 12 is a flow diagram illustrating procedures associated with activating a secondary uplink carrier.

FIG. 12 is a flow diagram illustrating procedures associated with activating a secondary uplink carrier. The WTRU 110 determines any uplink carrier(s) to activate (1210). The WTRU 110 determines an initial transmit power for an associated control channel (1220). The WTRU 110 determines an initial uplink transmit power for the uplink data channel (1230). The WTRU 110 then sets the DTX pattern (1240).

When the secondary uplink carrier is activated or initially configured, the WTRU 110 may start DPCCH transmissions a determined number of slots or a determined number of TTIs prior to initiating E-DCH transmissions on the secondary uplink carrier. The determined number of slots or TTIs may be configured by a higher layer. This may allow the WTRU 110 to establish the right power control loop in the secondary uplink carrier and start transmission at the right power level. In addition, a post-verification period may be defined to allow the WTRU 110 to start E-DCH transmission before synchronization is confirmed. The duration of the post-verification period may be smaller or larger than the post-verification period used for instance in the conventional synchronization procedures A, AA or B. A fast activation procedure may be defined for the secondary uplink carrier. Such fast activation relies on the fact that the WTRU 110 may use the information from the transmission power of the primary DPCCH carrier when establishing the transmission power on the secondary DPCCH carrier, as described below.

Embodiments for setting the initial DPCCH transmission power upon activation of the secondary uplink carrier are disclosed hereafter.

The initial DPCCH transmission power on the secondary uplink carrier may be set to the same value as the DPCCH transmission power on the primary uplink carrier, a predetermined number (n) of slots prior to the activation time (n≥0).

Alternatively, the initial DPCCH transmission power on the secondary uplink carrier may be set to the same value as the DPCCH transmission power on the primary uplink carrier, a predetermined number (n) of slots prior to the activation time (n≥0), plus or minus an offset (in dB). The offset may be a fixed pre-determined value. Alternatively, the offset may be a value signaled by the network at physical layer, MAC layer or RRC layer. The offset may be broadcast on system information. The network may determine the offset value based (in part) on the relative uplink interference conditions between the primary and supplementary uplink carriers. For instance, the offset may be a fixed value plus the difference between the interference level at the supplementary uplink carrier and the interference level at the primary uplink carrier. Alternatively, the offset value may be derived by the WTRU 110 based on uplink interference values signaled by the network. The network may signal the interference on each of the uplink carriers on system information block 7 (SIB7) via the corresponding downlink carriers. Alternatively, the network may also signal the interference on both uplink carriers on the system information block via the primary carrier (or the supplementary carrier) in order to accelerate acquisition of the values. The network may also signal the interference on both uplink carriers using dedicated signaling (PHY, MAC or RRC) along with an activation command or subsequent to an implicit activation by the WTRU 110. Alternatively, the offset may be determined based on the difference between the DPCCH power levels of the primary and supplementary uplink carriers observed the last time when both uplink carriers were activated. The value may be averaged over a certain time interval. Alternatively, the offset may be determined as per any one of the methods above, or any other method, and the choice of the method may depend on the amount of time elapsed since the supplementary uplink carrier was last activated. The WTRU 110 runs a timer(s) upon de-activation of the supplementary uplink carrier(s), and upon expiration of the timer(s) a corresponding method to determine the offset is selected.

The initial DPCCH transmission power on the secondary uplink carrier may be set to a fixed value signaled by the network at PHY, MAC or RRC layers along with an activation command or subsequent to an implicit activation by the WTRU 110. The initial DPCCH power may be broadcast on system information. The network may determine the initial DPCCH power based (in part) on the relative uplink interference conditions between the primary and supplementary uplink carriers.

The initial DPCCH transmission power on the secondary uplink carrier may be set to the same value signaled via RRC signaling for initial DPCCH power in the primary uplink carrier.

At the network side, the initial DPDCH or F-DPCH transmission power upon activation of the secondary uplink carrier may be determined according to one or a combination of the following. The initial F-DPCH transmission power on the secondary downlink carrier may be set to the same value as the F-DPCH transmission power on the primary downlink carrier, a predetermined number (n) of slots prior to the activation time (n≥0).

The initial F-DPCH transmission power on the secondary downlink carrier may be set to the same value as the F-DPCH transmission power on the primary downlink carrier, a predetermined number (n) of slots prior to the activation time (n≥0), plus an offset (in dB). The offset may be a fixed pre-determined value. Alternatively, the offset may be a value signaled by the WTRU 110 at PHY, MAC (e.g., modified scheduling information) or RRC (e.g., measurement report) on the primary uplink carrier subsequent to explicit or implicit activation of the secondary uplink carrier. The WTRU 110 may determine the offset value based on measured common pilot channel (CPICH) Ec/No, CPICH received signal code power (RSCP), channel quality indicator (CQI) on both downlink carriers. Alternatively, the offset may be determined by the network based on a measurement report or other information sent by the WTRU 110. The WTRU 110 may trigger the transmission of the measurement report upon implicit activation of the secondary uplink carrier or upon receiving an explicit activation command from the network. The WTRU 110 may trigger the transmission of CQI information for both downlink carriers (the primary and secondary downlink carriers corresponding to the uplink carrier to activate) over the HS-DPCCH of the primary uplink carrier upon implicit or explicit activation of the secondary uplink carrier.

When the secondary uplink carrier is activated, the WTRU 110 may use a default grant value for the initial E-DCH transmission, which is a value signaled to the WTRU 110 for use when the secondary uplink carrier is activated. The default grant value may be signaled to the WTRU 110 through RRC signaling upon configuration of the secondary uplink carrier. Alternatively, the WTRU 110 may use the same serving grant as being used in the primary uplink carrier at the time of the activation of the secondary uplink carrier. Alternatively, the WTRU 110 may trigger scheduling information and wait for an absolute grant for the secondary uplink carrier. In this case, the activation of the secondary uplink carrier may trigger the WTRU 110 to send scheduling information.

Upon activation of the secondary uplink carrier, the WTRU 110 may use the same DTX status as the primary uplink carrier. When the secondary uplink carrier is activated, the WTRU 110 may start using the same DTX and/or DRX pattern as in the primary uplink carrier. Alternatively, the WTRU 110 may start in a continuous mode in the secondary uplink carrier, or alternatively may start in WTRU_DTX_cycle_1 or WTRU_DTX_cycle_2.

Embodiments for controlling DTX/DRX patterns to optimize the battery saving and increased capacity with dual uplink carrier operation are disclosed hereafter. A single carrier WTRU 110 has two level DTX patterns: the physical layer DTX with two DTX cycles (WTRU_DTX_cycle_1 and WTRU_DTX_cycle_2) and the MAC layer DTX which is controlled by the parameter MAC_DTX_cycle.

In accordance with one embodiment, the WTRU 110 uplink DPCCH transmission pattern and bursts on the secondary uplink carrier may be aligned with the uplink DPCCH transmission pattern and bursts on the primary uplink carrier. For example, the network signals one set of DTX/DRX parameters that may be applied to all uplink carriers. The MAC_DTX_cycle may be applicable to all uplink carriers and E-TFC selection may be performed on all uplink carriers at the same time.

Due to the fact that the WTRU 110 has two physical layer DTX cycles (WTRU_DTX_cycle_1 and WTRU_DTX_cycle_2) and the WTRU_DTX_cycle_2 is triggered after a configured inactivity period while in WTRU_DTX_cycle_1, a method to process the aligned DTX pattern may be defined. For example, the inactivity period may be applied to both uplink carriers and the definition of the inactivity threshold for WTRU_DTX_cycle_2 may be defined as the number of consecutive E-DCH TTIs without an E-DCH transmission on all uplink carriers, and if there is no E-DCH transmission on both uplink carriers for the inactivity threshold, the WTRU 110 may immediately move from WTRU_DTX_cycle_1 to WTRU_DTX_cycle_2 on any of the uplink carriers. Alternatively, the WTRU 110 may keep track of E-DCH transmission on each uplink carrier individually, and if one of the uplink carriers does not have an E-DCH transmission for inactivity threshold, the WTRU 110 may move both uplink carriers to WTRU_DTX_cycle_2. Alternatively, if the secondary uplink carrier has been inactive for the configured amount of time, the secondary uplink carrier may move to the WTRU_DTX_cycle_2. The uplink DPCCH burst patterns may be the same on the uplink carriers.

The activation of DTX/DRX may be signaled via an HS-SCCH order over any of the downlink carriers and be applicable to both uplink carriers. This is applicable to the case where the WTRU 110 has the same DTX/DRX status on both uplink carriers. Alternatively, the HS-SCCH order may be used to control the DTX/DRX status on the uplink carriers independently. For instance, the downlink and uplink carriers are paired, and any order on a downlink carrier may be applicable to the corresponding uplink carrier.

In accordance with another embodiment, the WTRU 110 may use the DTX patterns with identical periods on both uplink carriers with different offsets so that the patterns are staggered, (i.e., the DPCCH transmissions on each uplink carrier do not take place at the same time). This configuration may be combined with another embodiment where the WTRU 110 applies E-DCH start time restrictions, (i.e., MAC DTX), on a per-carrier basis. This means that the WTRU 110 does not perform E-DCH transmission (or E-TFC selection) in every sub-frame for a given uplink carrier. The sets of sub-frames, (i.e., patterns), where E-DCH transmission is allowed may be different, (e.g., staggered), between the uplink carriers. The WTRU 110 may use per-carrier E-DCH start time restriction patterns that coincide with the corresponding per-carrier DTX patterns to minimize or eliminate the occurrences of having simultaneous E-DCH transmission on both carriers.

In accordance with another embodiment, the WTRU 110 may use independent DTX cycles for the primary and secondary uplink carriers. For example, the physical layer DTX cycles (WTRU_DTX_cycle_1 and WTRU_DTX_cycle_2) may have different values for both uplink carriers. For the purpose of this embodiment, WTRU_P_DTX_cycle_x and WTRU_S_DTX_cycle_x are referred to as the DTX cycles applicable to the primary and secondary uplink carriers, respectively, where x refers to cycle 1 or 2.

The network may independently signal WTRU_P_DTX_cycle_1 or WTRU_P_DTX_cycle_2, or WTRU_S_DTX_cycle_1 or WTRU_S_DTX_cycle_2. The values WTRU_S_DTX_cycle_x may be an integer multiple or divisors of the value WTRU_P_DTX_cycle_x. The network may signal one set of DTX cycles for the primary uplink carrier and the WTRU 110 determines the cycle to be used for the secondary uplink carrier based on the factor, N, which may be predefined or signaled by a higher layer. For example:

$$WTRU\_S\_DTX\_cycle\_x = WTRU\_P\_DTX\_Cycle\_x \times N \quad \text{Equation (1)}$$

Alternatively, one DTX_cycle may be configured for the secondary uplink carrier. For example, the primary uplink carrier may be configured with both DTX cycles 1 and 2, but the secondary uplink carrier may be configured with one DTX cycle (WTRU_S_DTX_cycle).

The WTRU 110 may move from continuous reception to WTRU_DTX_cycle_1 in the primary carrier and to WTRU_S_DTX_cycle in the secondary carrier. WTRU_S_DTX_cycle may be equivalent to WTRU_DTX_cycle_1, WTRU_DTX_cycle_2, or a different network configured value.

After no E-DCH transmission for an inactivity threshold, the primary uplink carrier may move to DTX cycle 2, and the supplementary carrier may be optionally deactivated instead of moving to DTX cycle 2. Since the WTRU 110 is considered to be in low E-DCH activity, the WTRU 110 may deactivate the secondary uplink carrier.

The MAC DTX cycle and pattern may be the same for both uplink carriers. This may allow the WTRU 110 to schedule on any of the uplink carriers if E-DCH data is present, possibly optimizing on grant, power, etc. Alternatively, the MAC DTX cycle may be similar on both uplink carriers, but the patterns between both uplink carriers may be offset by a configured offset value. Alternatively, the MAC DTX cycle may be different values for each uplink carrier.

The same may be applicable to WTRU 110 physical layer DTX cycle. The WTRU 110 DTX pattern of the secondary uplink carrier may be offset by a predetermined or configured offset value from the WTRU 110 DTX pattern of the primary uplink carrier.

Alternatively, the WTRU 110 may have the same DTX cycle and offset configuration depending on the activity of each uplink carrier. The WTRU 110 may be allowed to be operating in continuous reception in one uplink carrier and in DTX cycle 1 or 2 on the other uplink carrier. Alternatively, the anchor uplink carrier may be operating with DTX cycle 1 and the secondary uplink carrier with DTX cycle 2. This may allow the WTRU 110 to save on transmitting DPCCH and other control channels on one of the uplink carriers if no data may be transmitted.

With single uplink carrier activation, if the WTRU 110 has DTX activated and E-DCH scheduled data is transmitted, the WTRU 110 may monitor the E-AGCH and E-RGCH from all cells in the active set for "Inactivity Threshold for WTRU 110 Grant Monitoring" TTIs. With multi carrier or dual cell operation, the WTRU 110 may monitor the E-AGCH and E-RGCH associated to both uplink carriers if any E-DCH transmission is triggered (independent of the uplink carrier being used) for "Inactivity Threshold for WTRU 110 Grant Monitoring" TTIs. Alternatively, the WTRU 110 may monitor the E-AGCH and E-RGCH associated to the uplink carrier for which E-DCH transmission was present.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
   a transceiver configured to communicate on a primary carrier and a supplementary carrier;
   the transceiver is further configured to receive a medium access control (MAC) message indicating activation or deactivation of the supplementary carrier;
   wherein on a condition that the MAC message indicates that the supplementary carrier is activated, the WTRU monitors the supplementary carrier for control messages;
   wherein on a condition that the MAC message indicates that the supplementary carrier is deactivated, the WTRU ceases monitoring the supplementary carrier;
   a processor configured to start a timer based on activation of the supplementary carrier, wherein the timer is for a number of transmission time intervals (TTIs) of inactivity for the WTRU on the supplementary carrier; and
   wherein on a condition that the timer expires, the WTRU deactivates the supplementary carrier and flushes a HARQ entity associated with the supplementary carrier.

2. The WTRU of claim 1 further comprising:
   the transceiver is further configured to receive radio resource control signaling from a base station configuring the supplementary carrier.

3. The WTRU of claim 1, wherein the MAC message includes a bit map and a bit in the bit map indicates whether at least one of a plurality of supplementary carriers is activated or deactivated.

4. The WTRU of claim 1, wherein the primary carrier and the supplementary carrier are part of LTE or LTE-A cells.

5. The WTRU of claim 1, wherein the primary carrier and the supplementary carrier are part of W-CDMA cells.

6. The WTRU of claim 1, wherein the WTRU transmits a physical control channel using the primary carrier without transmission of a control channel on the supplementary carrier.

7. A method performed by a wireless transmit/receive unit (WTRU), the method comprising:
   communicating, by a transceiver of the WTRU, on a primary carrier and a supplementary carrier;
   receiving, by the transceiver, a medium access control (MAC) message indicating activation or deactivation of the supplementary carrier;
   wherein on a condition that the MAC message indicates that the supplementary carrier is activated, the WTRU monitors the supplementary carrier for control messages;
   wherein on a condition that the MAC message indicates that the supplementary carrier is deactivated, the WTRU ceases monitoring the supplementary carrier;
   starting, by a processor of the WTRU, a timer based on activation of the supplementary carrier, wherein the timer is for a number of transmission time intervals (TTIs) of inactivity for the WTRU on the supplementary carrier; and
   wherein on a condition that the timer expires, the WTRU deactivates the supplementary carrier and flushes a HARQ entity associated with the supplementary carrier.

8. The method of claim 7 further comprising:
   receiving, by the transceiver, radio resource control signaling from a base station configuring the supplementary carrier.

9. The method of claim 7, wherein the MAC message includes a bit map and a bit in the bit map indicates whether at least one of a plurality of supplementary carriers is activated or deactivated.

10. The method of claim 7, wherein the primary carrier and the supplementary carrier are part of LTE or LTE-A cells.

11. The method of claim 7, wherein the primary carrier and the supplementary carrier are part of W-CDMA cells.

12. The method of claim 7, wherein the WTRU transmits a physical control channel using the primary carrier without transmission of a control channel on the supplementary carrier.

* * * * *